US011882498B2

(12) United States Patent
Iwai

(10) Patent No.: US 11,882,498 B2
(45) Date of Patent: Jan. 23, 2024

(54) REMOTE CONTROL DEVICE, MOVING DEVICE, AND COMMUNICATION CONTROL METHOD, AND PROGRAM

(71) Applicant: SONY GROUP CORPORATION, Tokyo (JP)

(72) Inventor: Takuya Iwai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 313 days.

(21) Appl. No.: 17/421,040

(22) PCT Filed: Dec. 25, 2019

(86) PCT No.: PCT/JP2019/050978
§ 371 (c)(1),
(2) Date: Jul. 7, 2021

(87) PCT Pub. No.: WO2020/149131
PCT Pub. Date: Jul. 23, 2020

(65) Prior Publication Data
US 2022/0159412 A1 May 19, 2022

(30) Foreign Application Priority Data
Jan. 15, 2019 (JP) .................. 2019-004612

(51) Int. Cl.
H04W 4/02 (2018.01)
H04W 4/029 (2018.01)
(Continued)

(52) U.S. Cl.
CPC ........... H04W 4/023 (2013.01); B64C 39/024 (2013.01); H04W 4/029 (2018.02); H04W 28/06 (2013.01); B64U 2201/20 (2023.01)

(58) Field of Classification Search
CPC ..... H04W 4/023; H04W 4/029; H04W 28/06; B64C 39/024; B64U 2201/20; G08C 17/02
(Continued)

(56) References Cited

U.S. PATENT DOCUMENTS 5,924,042 A * 7/1999 Sakamoto ............. H04W 68/06
455/445
2016/0132933 A1* 5/2016 Kunihiro ............... H04W 4/029
705/14.58

(Continued)

FOREIGN PATENT DOCUMENTS

CN 205788719 U 12/2016
JP 8-204629 A 8/1996
(Continued)

OTHER PUBLICATIONS

International Search Report and Written Opinion of PCT Application No. PCT/JP2019/050978, dated Mar. 3, 2020, 10 pages of ISRWO.
(Continued)

Primary Examiner — Don N Vo
(74) Attorney, Agent, or Firm — CHIP LAW GROUP

(57) ABSTRACT

Even in communication via a long-distance wireless link unit, a packet size is reduced and a packet transmission frequency is increased so that a moving device can be finely controlled. An instruction generation unit that generates a packet containing control information for a moving device, and a wireless communication unit that transmits the packet are included. The wireless communication unit includes a
(Continued)

plurality of wireless link units that executes wireless communication in different frequency bands. In a case where the distance to the moving device is equal to or greater than a threshold value, the instruction generation unit generates a packet of a size smaller than that in a case where the distance is less than the threshold value, and calculates an allowable packet transmission frequency on the basis of the packet size, thereby executing high-frequency packet generation and transmission processing.

14 Claims, 15 Drawing Sheets

(51) Int. Cl.
*B64C 39/02* (2023.01)
*H04W 28/06* (2009.01)

(58) Field of Classification Search
USPC ...................................................... 455/456.1
See application file for complete search history.

(56) References Cited

U.S. PATENT DOCUMENTS

2017/0257862 A1     9/2017   Xue et al.
2022/0167133 A1*   5/2022   Kraeling ................. H04W 4/48

FOREIGN PATENT DOCUMENTS

| | | |
|---|---|---|
| JP | 2005101887 A | 4/2005 |
| JP | 2018111154 A | 7/2018 |
| JP | 2018-127034 A | 8/2018 |
| JP | 2018-179534 A | 11/2018 |
| KR | 20130002492 A | 1/2013 |
| TW | 201733397 A | 9/2017 |
| WO | WO-2014141635 A1 | 9/2014 |
| WO | 2017/155587 A1 | 9/2017 |

OTHER PUBLICATIONS

Kagawa, et al., "A Development of Multi-hop Control Communication System using 169 MHz and 920 MHz bands for Dependable Drone Operation in Beyond Line-of-Sight", IEICE Technical Report, ISSN: 0913-5685, vol. 117, No. 348, Dec. 7, 2017, pp. 275-278.

* cited by examiner

REMOTE CONTROL DEVICE, MOVING DEVICE, AND COMMUNICATION CONTROL METHOD, AND PROGRAM

CROSS REFERENCE TO RELATED APPLICATIONS

This application is a U.S. National Phase of International Patent Application No. PCT/JP2019/050978 filed on Dec. 25, 2019, which claims priority benefit of Japanese Patent Application No. JP 2019-004612 filed in the Japan Patent Office on Jan. 15, 2019. Each of the above-referenced applications is hereby incorporated herein by reference in its entirety.

TECHNICAL FIELD

The present disclosure relates to a remote control device, a moving device, and a communication control method, and a program. More specifically, the present disclosure relates to a remote control device, a moving device, and a communication control method, and a program for remotely controlling a moving device such as a drone.

BACKGROUND ART

In recent years, the use of drones, which are compact flying objects that fly by remote control, has increased rapidly.

For example, a drone with a camera attached is used for processing such as imaging of a landscape on the ground from the sky.

Furthermore, aerial images using drones have recently been used in terrain verification processing, survey processing, construction sites, or the like.

A drone is flight-controlled by instructions from a remote controller on the ground, for example.

Many drones have a configuration in which processing of starting or stopping imaging by a camera attached to the drone, imaging settings, and the like are also controlled in accordance with instructions from a remote controller on the ground.

Note that examples of a conventional technology that discloses processing of controlling a flying object such as a drone include Patent Document 1 (Japanese Patent Application Laid-Open No. 2018-179534).

CITATION LIST

Patent Document

Patent Document 1: Japanese Patent Application Laid-Open No. 2018-179534

SUMMARY OF THE INVENTION

Problems to be Solved by the Invention

In a case where a remote control device, which is a controller, controls a flying object such as a drone, it is necessary to perform processing of transmitting, to the flying object, a packet that contains information regarding positions of a button and a stick constituting an operation unit included in the remote control device, as control information (instruction information).

In such communication data, for example, signals encoded by an RC protocol encoding method such as a pulse position modulation (PPM) or a pulse code modulation (PCM) are widely used.

The RC protocol requires a small amount of information of about 10 to 20 bytes to be continuously transmitted at a high frequency of equal to or greater than 50 Hz.

A frequency band used for communication is, for example, a 2.4 GHz frequency band. However, in this frequency band, as the distance between the remote control device and the flying object increases, radio wave attenuation increases and resistance to diffraction decreases, and this makes control over a long distance difficult.

In order to solve this, it is conceivable to perform communication in a frequency range such as a 920 MHz band that offers mild radio wave attenuation with respect to the distance and excellent resistance to diffraction.

However, an Association of Radio Industries and Businesses (ARIB) regulation (STD-T108) for transmitting control signals using a 920 MHz band frequency specifies that a duty ratio of a transmission time should be $1/10$ or less.

According to this regulation, the number of instructions (the number of channels) and the frequency that the remote control device can issue to the flying object such as a drone at one time are limited, and this makes it impossible to transmit a high-density control signal to the flying object. It is therefore difficult to stably control a flying object such as a drone by using only the 920 MHz band in which stable long-distance communication can be expected.

The present disclosure has been made in view of, for example, the above problems, and is aimed at providing a remote control device, a moving device, and a communication control method, and a program that enable stable control regardless of whether the distance between a remote control device and a flying object such as a drone or another moving device is long or short.

Solutions to Problems

A first aspect of the present disclosure provides
a remote control device including:
an instruction generation unit that generates a packet containing control information for a moving device; and
a wireless communication unit that transmits the packet generated by the instruction generation unit,
in which the wireless communication unit includes a plurality of wireless link units that executes wireless communication in different frequency bands, and
the instruction generation unit executes, in a case where a distance to the moving device is equal to or greater than a threshold value, packet generation processing that makes the packet smaller in size than in a case where the distance is less than the threshold value.

Moreover, a second aspect of the present disclosure provides
a moving device including:
a wireless communication unit that includes a plurality of wireless link units capable of executing communication in different frequency bands;
a position information generation unit that generates position information of the moving device;
a position information notification unit that transmits the position information generated by the position information generation unit to a remote control device via the wireless communication unit; and a wireless link determination unit that determines which of the plurality of wireless link units of the wireless communication unit is to be used for transmission of the position information, in which the wireless link determination unit determines a wireless link unit that has received a latest packet from the remote control device as a transmission unit for the position information.

Moreover, a third aspect of the present disclosure provides a communication control method executed by a remote control device, the communication control method including:

an instruction generation step of generating, by an instruction generation unit, a packet containing control information for a moving device; and a wireless communication step of transmitting, by a wireless communication unit, the packet generated in the instruction generation step, in which the wireless communication unit includes a plurality of wireless link units that executes wireless communication in different frequency bands, and in the instruction generation step, packet generation processing is executed in which, in a case where a distance to the moving device is equal to or greater than a threshold value, the generated packet is smaller in size than in a case where the distance to the moving device is less than the threshold value.

Moreover, a fourth aspect of the present disclosure provides a communication control method executed by a moving device, in which the moving device includes:

a wireless communication unit that includes a plurality of wireless link units capable of executing communication in different frequency bands;

a position information generation unit that generates position information of the moving device;

a position information notification unit that transmits the position information generated by the position information generation unit to a remote control device via the wireless communication unit; and a wireless link determination unit that determines which of the plurality of wireless link units of the wireless communication unit is to be used for transmission of the position information, and the wireless link determination unit determines a wireless link unit that has received a latest packet from the remote control device as a transmission unit for the position information.

Moreover, a fifth aspect of the present disclosure provides a program that causes a remote control device to execute communication control processing, the program causing:

an instruction generation unit to execute an instruction generation step of generating a packet containing control information for a moving device; and a wireless communication unit to execute a wireless communication step of transmitting the packet generated in the instruction generation step, in which the wireless communication unit includes a plurality of wireless link units that executes wireless communication in different frequency bands, and the program causes, in the instruction generation step, execution of packet generation processing in which, in a case where a distance to the moving device is equal to or greater than a threshold value, the generated packet is smaller in size than in a case where the distance to the moving device is less than the threshold value.

Note that the program of the present disclosure can be, for example, provided by a storage medium or a communication medium provided in a computer-readable format to an information processing apparatus or a computer system capable of executing a variety of program codes. Providing such a program in a computer-readable format enables implementation of processing on the information processing apparatus or the computer system in accordance with the program.

Other objects, features, and advantages of the present disclosure will become apparent from the detailed description based on the embodiment of the present disclosure described later and the accompanying drawings. Note that, in the present specification, a system is a logical set configuration of a plurality of devices, and is not limited to one in which each configuration device is in the same housing.

Effects of the Invention

According to the configuration of one embodiment of the present disclosure, even in communication via a long-distance wireless link unit, a packet size is reduced and a packet transmission frequency is increased so that a moving device can be finely controlled.

Specifically, for example, an instruction generation unit that generates a packet containing control information for a moving device, and a wireless communication unit that transmits the packet are included. The wireless communication unit includes a plurality of wireless link units that executes wireless communication in different frequency bands. In a case where the distance to the moving device is equal to or greater than a threshold value, the instruction generation unit generates a packet of a size smaller than that in a case where the distance is less than the threshold value, and calculates an allowable packet transmission frequency on the basis of the packet size, thereby executing high-frequency packet generation and transmission processing.

With this configuration, even in communication via the long-distance wireless link unit, the packet size is reduced and the packet transmission frequency is increased so that a moving device can be finely controlled.

Note that effects described herein are merely illustrative and are not intended to be restrictive, and there may be additional effects.

MODE FOR CARRYING OUT THE INVENTION

Figure 1:
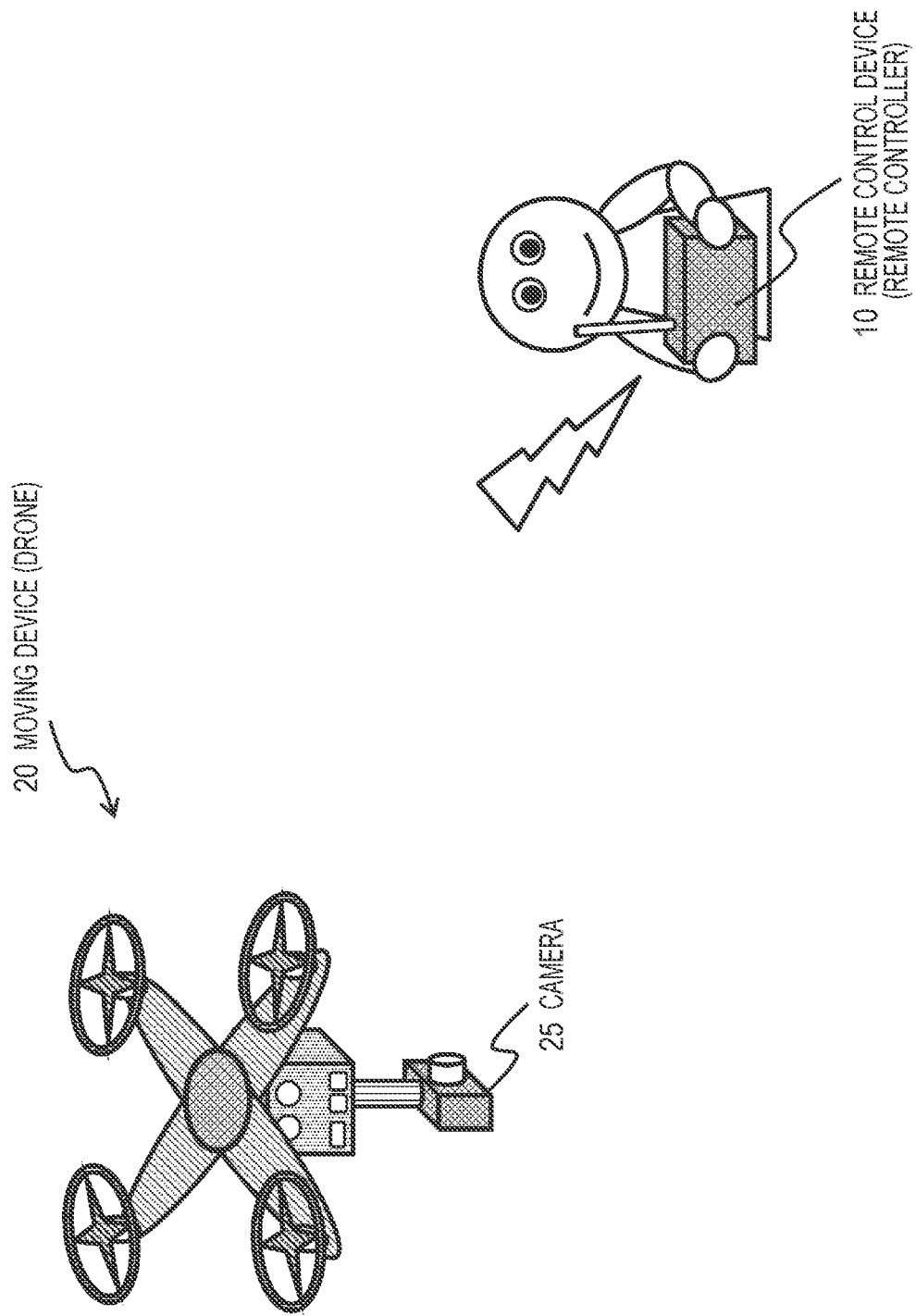
FIG. 1 is a diagram illustrating an example of a system configuration to which processing of the present disclosure can be applied.

A remote control device, a moving device, and a communication control method, and a program of the present disclosure will be described below in detail with reference to the drawings. Note that the description will be given according to the following items.

1. Configuration example of system to which processing of present disclosure can be applied and outline of processing of present disclosure
2. Configuration and processing of first embodiment of present disclosure
  2-1. Configuration example of remote control device and moving device
  2-2. Details of packet generation and transmission processing executed by instruction generation unit
  2-3. Processing sequence executed by remote control device
  2-4. Processing sequence executed by moving device
3. Configuration and processing of second embodiment of present disclosure
  3-1. Configuration example of remote control device and moving device
  3-2. Details of packet generation and transmission processing executed by instruction generation unit
  3-3. Processing sequence executed by remote control device
  3-4. Processing sequence executed by moving device
4. Configuration and processing of third embodiment of present disclosure
  4-1. Configuration example of remote control device and moving device
  4-2. Configuration example of packet generated by instruction generation unit
  4-3. Processing sequence executed by remote control device
  4-4. Processing sequence executed by moving device
5. Summary of configuration of present disclosure 1. Configuration Example of System to which Processing of Present Disclosure can be Applied and Outline of Processing of Present Disclosure First, a configuration example of a system to which processing of the present disclosure can be applied and an outline of the processing of the present disclosure will be described with reference to FIG. 1 and the following figures.

FIG. 1 is a diagram illustrating a configuration example of a system to which the processing of the present disclosure can be applied.

FIG. 1 illustrates a remote control device (remote controller) 10 and a moving device (drone) 20. The moving device (drone) 20 receives a control signal transmitted from the remote control device 10, and flies on the basis of the received control signal. A camera 25 is attached to the moving device (drone) 10, and captures an image on the basis of a control signal received from the remote control device 10.

The processing of the present disclosure can be used in, for example, this system illustrated in FIG. 1.

However, the system configuration illustrated in FIG. 1 is an example of a configuration to which the processing of the present disclosure can be applied, and the processing of the present disclosure can be used in a variety of systems for remotely controlling a moving device (remote control).

The moving device to be controlled is not limited to a flying moving device such as a drone, but may be, for example, a moving device such as a robot or a vehicle running on the ground.

Hereinafter, embodiments using a drone as an example of the moving device to be controlled will be described.

The system illustrated in FIG. 1 causes the moving device 20 to which the camera 25 is attached to fly in accordance with control information transmitted by the remote control device 10 held by a user on the ground, and causes the camera 25 to capture an image.

The outline of the processing of the present disclosure will be described with reference to FIG. 2.

In a case where the remote control device 10 controls the moving device 20, processing is performed in which a packet that contains information regarding positions of a button and a stick constituting an operation unit included in the remote control device 10, as control information (instruction information), is transmitted to the moving device 20.

As described above, for this communication data, for example, communication data in accordance with the RC protocol is used. Signals encoded by an encoding method according to the RC protocol such as a pulse position modulation (PPM) or a pulse code modulation (PCM) are used as communication data.

As the frequency band used for communication, for example, the 2.4 GHz frequency band can be used. However, in this frequency band, as the distance between the remote control device and the flying object increases, the radio wave attenuation increases and the resistance to diffraction decreases, and this makes control over a long distance difficult.

On the other hand, the 920 MHz frequency band is suitable for control over a long distance because of less increase in radio wave attenuation even at long distances and excellent resistance to diffraction.

However, as an Association of Radio Industries and Businesses (ARIB) regulation (STD-T108) for transmitting control signals in the 920 MHz band frequency, there is a restrictive regulation that specifies that the duty ratio of the transmission time should be 1/10 or less.

According to this regulation, the number of instructions (the number of channels) and the frequency that the remote control device 10 can issue to the moving device 20 such as a drone at one time are limited, and this makes it impossible to transmit a high-density control signal to the flying object.

It is therefore difficult to stably control a flying object such as a drone by using only the 920 MHz band in which stable long-distance communication can be expected.

The present disclosure solves this problem and provides a configuration that allows for switching between transmission of control information using the 2.4 GHz frequency band and transmission of control information using the 920 MHz frequency band, in accordance with the distance between the remote control device 10 and the moving device 20 such as a drone.

Figure 2:
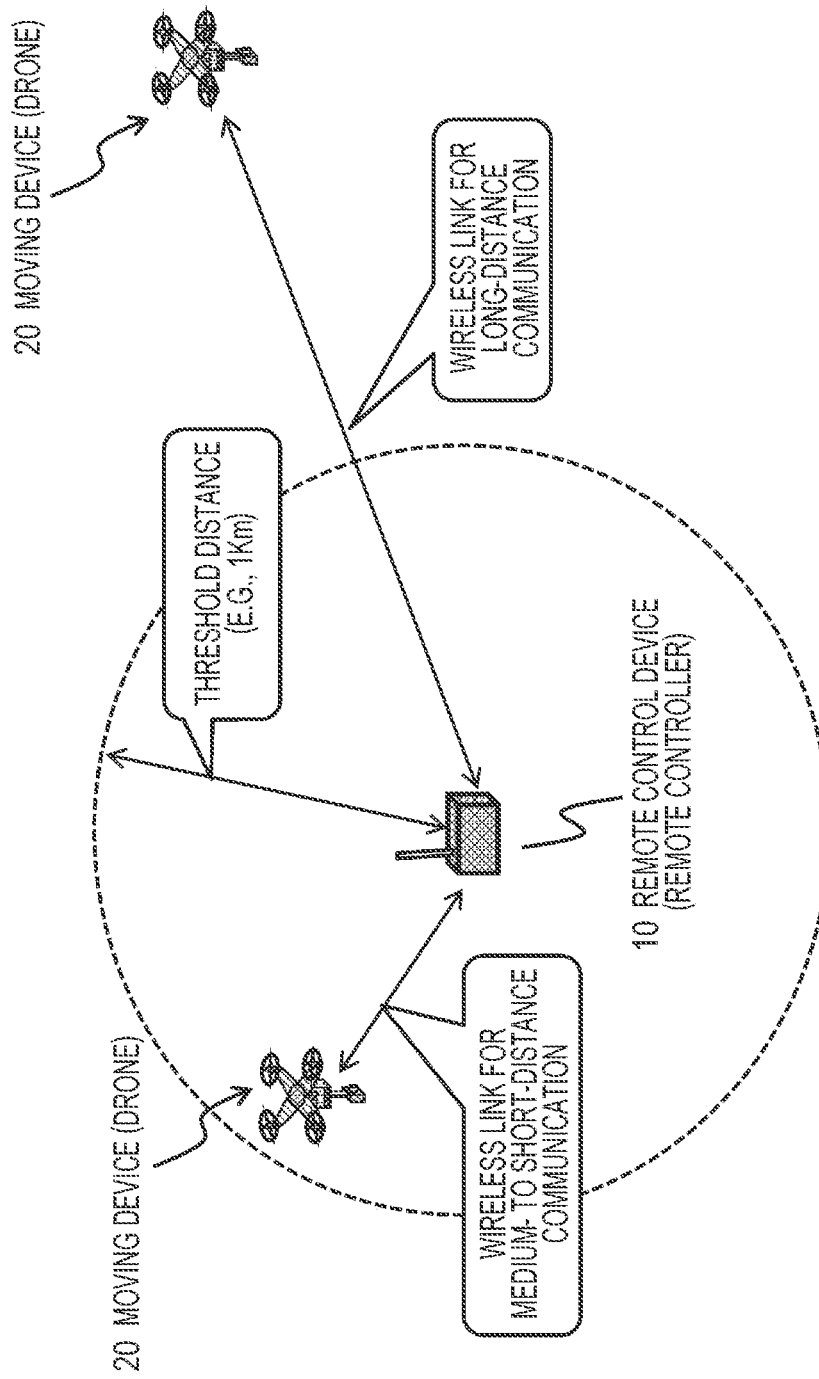
FIG. 2 is a diagram illustrating an outline of the processing of the present disclosure.

As illustrated in FIG. 2, in a case where the distance between the remote control device 10 and the moving device 20 such as a drone is within a threshold distance (e.g., 1 km) specified in advance, the 2.4 GHz frequency band is used for communication between the remote control device 10 and the moving device 20 via a wireless link for medium- to short-distance communication. On the other hand, in a case where the distance between the remote control device 10 and the moving device 20 is equal to or greater than the threshold distance (e.g., 1 km), the 920 MHz frequency band is used for communication between the remote control device 10 and the moving device 20 via a wireless link for long-distance communication.

In this way, two types of different communication bands are used for communication in accordance with the distance between the remote control device 10 and the moving device 20 such as a drone.

Note that, in the example illustrated in FIG. 2, the threshold distance is 1 km, but this threshold distance can be set in a variety of ways.

It is also possible to adopt a configuration that allows for adjustment by a user in accordance with a communication environment.

Furthermore, an example will be described in which the communication frequency range used for a distance less than the threshold distance and the communication frequency range used for a distance equal to or greater than the threshold distance are 2.4 GHz and 920 MHz, respectively, as in the example described previously, and this can also be set in a variety of ways. Note that the communication frequency range used for a distance equal to or greater than the threshold distance is set to be lower than the communication frequency range used for a distance less than the threshold distance. This enables stable communication processing over a long distance.

2. Configuration and Processing of First Embodiment of Present Disclosure

Next, a configuration and processing of a first embodiment of the present disclosure will be described with reference to FIG. 3 and the following figures.

[2-1. Configuration Example of Remote Control Device and Moving Device]

First, a configuration example of a remote control device 110 and a moving device 120 of the first embodiment will be described with reference to FIG. 3.

Figure 3:
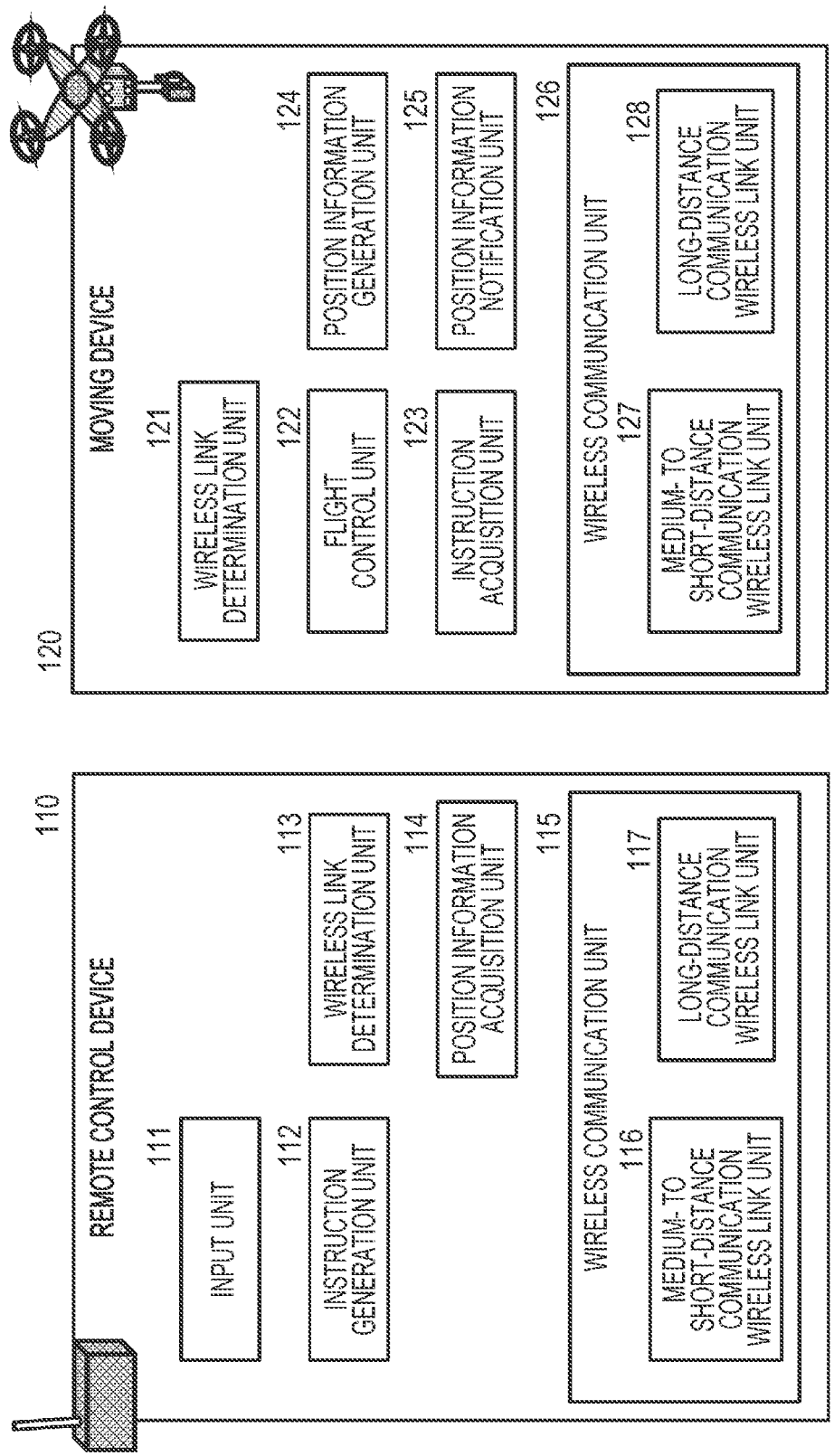
FIG. 3 is a diagram illustrating a configuration example of a remote control device and a moving device of a first embodiment.

FIG. 3 is a block diagram illustrating configurations of the remote control device 110 and the moving device 120 of the first embodiment.

The remote control device 110 includes an input unit 111, an instruction generation unit 112, a wireless link determination unit 113, a position information acquisition unit 114, and a wireless communication unit 115.

The wireless communication unit 115 includes a medium- to short-distance communication wireless link unit 116 and a long-distance communication wireless link unit 117.

The medium- to short-distance communication wireless link unit 116 is a wireless communication unit that executes communication processing in a high frequency range suitable for medium- to short-distance communication, for example, a high frequency band such as a 2.4 GHz band.

On the other hand, the long-distance communication wireless link unit 117 is a wireless communication unit that executes communication processing in a low frequency range suitable for long-distance communication, for example, a low frequency band such as a 920 MHz band.

The input unit 111 is an input unit (user interface) that can be operated by a user, such as a stick or a button. User operation information via the input unit 111 is input to the instruction generation unit 112.

The instruction generation unit 112 generates a packet containing control information to be transmitted via the wireless communication unit 115.

The instruction generation unit 112 generates a packet in which a control instruction in accordance with the user operation information via the input unit 111 is contained as payload data, and outputs the packet to the wireless communication unit 115.

The wireless link determination unit 113 determines which of the medium- to short-distance communication wireless link unit 116 or the long-distance communication wireless link unit 117 in the wireless communication unit 115 is to be used for communication.

For this determination processing, the wireless link determination unit 113 calculates the distance between the remote control device 110 and the moving device 120.

In a case where the calculated distance is less than a threshold distance (e.g., 1 km) specified in advance, communication using the medium- to short-distance communication wireless link unit 116 is executed. On the other hand, in a case where the calculated distance is equal to or greater than the threshold distance (e.g., 1 km) specified in advance, communication using the long-distance communication wireless link unit 117 is executed.

The wireless link determination unit 113 inputs position information indicating a position of the moving device 120 from the position information acquisition unit 114 for calculation of the distance between the remote control device 110 and the moving device 120.

The moving device 120 calculates a self-position using, for example, a GPS signal as needed, and transmits information regarding the calculated self-position to the remote control device 110.

The position information acquisition unit 114 outputs position information received from the moving device 120 to the wireless link determination unit 113 as needed.

Note that an initial position of the moving device 120 is substantially the same as the position of the remote control device 110.

The wireless link determination unit 113 calculates the distance between the remote control device 110 and the moving device 120 by calculating a difference between this initial position and a current position of the moving device 120.

In a case where the calculation result is less than the threshold distance (e.g., 1 km), communication using the medium- to short-distance communication wireless link unit 116 is executed. On the other hand, in a case where the calculated distance is equal to or greater than the threshold distance (e.g., 1 km) specified in advance, communication using the long-distance communication wireless link unit 117 is executed.

Note that information regarding the determination by the wireless link determination unit 113, that is, used communication link determination information regarding whether communication using the medium- to short-distance communication wireless link unit 116 is to be executed or communication using the long-distance communication wireless link unit 117 is to be executed is also input to the instruction generation unit 112 that generates communication packets.

The instruction generation unit 112 generates communication packets in a different mode depending on the used communication link determination information.

A packet transmission interval in a case of communication using the medium- to short-distance communication wireless link unit 116 and a packet transmission interval in a case of communication using the long-distance communication wireless link unit 117 are different from each other.

The instruction generation unit 112 executes communication packet generation processing at a different interval depending on which link unit is used for communication.

In general, in a case of communication using the medium- to short-distance communication wireless link unit 116, packets are generated at a shorter interval. That is, packets are generated with high frequency.

In a case of communication using the medium- to short-distance communication wireless link unit 116, the instruction generation unit 112 generates packets in which control instructions in accordance with user operation information via the input unit 111 are contained as payload data at a short interval (high frequency), and provides the packets to the wireless communication unit 115.

On the other hand, in a case of communication using the long-distance communication wireless link unit 117, packets are generated at a longer interval than in a case where the medium- to short-distance communication wireless link unit 116 is used. That is, packets are generated with low frequency.

In a case of communication using the long-distance communication wireless link unit 117, the instruction generation unit 112 generates packets in which control instructions in accordance with user operation information via the input unit 111 are contained as payload data at a longer interval (low frequency) than in a case where the medium- to short-distance communication wireless link unit 116 is used, and provides the packets to the wireless communication unit 115.

Furthermore, the instruction generation unit 112 generates a packet having a different packet configuration depending on whether communication using the medium- to short-distance communication wireless link unit 116 is executed or communication using the long-distance communication wireless link unit 117 is executed.

Specific examples of communication packets will be described later.

In this way, the remote control device 110 has two communication units, the medium- to short-distance communication wireless link unit 116 and the long-distance communication wireless link unit 117, and switches between and uses these two communication units in accordance with the distance between the remote control device 110 and the moving device 120.

That is, two communication units:
(first wireless link unit) the medium- to short-distance communication wireless link unit 116 that executes communication using a wireless link (2.4 GHz band) suitable for communication over a medium- to short-distance (e.g., less than 1 km) that is subject to lax communication constraints; and
(second wireless link unit) the long-distance communication wireless link unit 117 that executes communication using a wireless link (e.g., 920 MHz band) suitable for long-distance (e.g., 1 km or more) communication that is subject to communication constraints such as a constraint on the transmission time,
are switched between and used in accordance with the distance between the remote control device 110 and the moving device 120.

In a case where the distance between the remote control device 110 and the moving device 120 is short, a medium- to short-distance link is used for transmission of packets with high frequency. This processing enables fine control. On the other hand, in a case where the remote control device 110 and the moving device 120 are distant from each other, a long-distance link is used for transmission of packets with low-frequency in accordance with a standardized limitation.

Next, the configuration of the moving device 120 illustrated in FIG. 3 will be described.

As illustrated in FIG. 3, the moving device 120 includes a wireless link determination unit 121, a flight control unit 122, an instruction acquisition unit 123, a position information generation unit 124, a position information notification unit 125, and a wireless communication unit 126.

The wireless communication unit 126 includes a medium- to short-distance communication wireless link unit 127 and a long-distance communication wireless link unit 128.

The medium- to short-distance communication wireless link unit 127 is a wireless communication unit that executes communication processing in a high frequency range suitable for medium- to short-distance communication, for example, a high frequency band such as a 2.4 GHz band.

On the other hand, the long-distance communication wireless link unit 128 is a wireless communication unit that executes communication processing in a low frequency range suitable for long-distance communication, for example, a low frequency band such as a 920 MHz band.

The instruction acquisition unit 123 inputs a packet transmitted by the remote control device 110 and received by the medium- to short-distance communication wireless link unit 127 or the long-distance communication wireless link unit 128 of the wireless communication unit 126, and acquires control information (instruction information) contained as payload data in the packet.

The instruction acquisition unit 123 outputs the control information (instruction information) acquired from the packet to the flight control unit 122.

The flight control unit 122 controls the moving device 120 in accordance with the control information (instruction information) acquired from the packet. Specifically, controls and the like regarding ascending, descending, a change in traveling direction, and the like are executed. Moreover, imaging by a camera may be controlled in some cases.

The position information generation unit 124 generates position information indicating the current position of the moving device 120. For example, the self-position is acquired on the basis of a signal received from a GPS satellite or the like.

Alternatively, the self-position may be calculated by self-position estimation by simultaneous localization and mapping (SLAM).

The position information generated by the position information generation unit 124 is output to the position information notification unit 125.

The position information notification unit 125 generates a packet that contains the position information indicating the current position of the moving device 120 generated by the position information generation unit 124, and transmits the packet to the remote control device 110 via the medium- to short-distance communication wireless link unit 127 or the long-distance communication wireless link unit 128 of the wireless communication unit 126.

The wireless link determination unit 121 determines whether to use the medium- to short-distance communication wireless link unit 127 or the long-distance communication wireless link unit 128.

The wireless link determination unit 121 selects, for example, the link unit that has received the latest packet from the remote control device 110 as a communication unit to be used for transmitting the packet containing the position information.

[2-2. Details of Packet Generation and Transmission Processing Executed by Instruction Generation Unit]

Next, details of the packet generation and transmission processing executed by the instruction generation unit 112 will be described with reference to FIG. 4 and the following figures.

As described above, the instruction generation unit 112 generates a packet containing control information to be transmitted via the wireless communication unit 115. That is, a packet in which a control instruction in accordance with user operation information input via the input unit 111 is contained as payload data is generated.

However, as described above, the packet transmission interval in a case of communication using the medium- to short-distance communication wireless link unit 116 and the packet transmission interval in a case of communication using the long-distance communication wireless link unit 117 are different from each other.

It is therefore necessary for the instruction generation unit 112 to execute the communication packet generation processing at a different interval depending on which link unit is used for communication.

The instruction generation unit 112 calculates a packet transmission frequency F [Hz] to determine a packet generation interval.

The packet transmission frequency F [Hz] differs between that at the time of communication using the medium- to short-distance communication wireless link unit 116 and that at the time of communication using the long-distance communication wireless link unit 117.

Hereinafter,
the packet transmission frequency at the time of communication using the medium- to short-distance communication wireless link unit 116 is expressed as F (S) [Hz], and
the packet transmission frequency at the time of communication using the long-distance communication wireless link unit 117 is expressed as F (L) [Hz].

Figure 4:
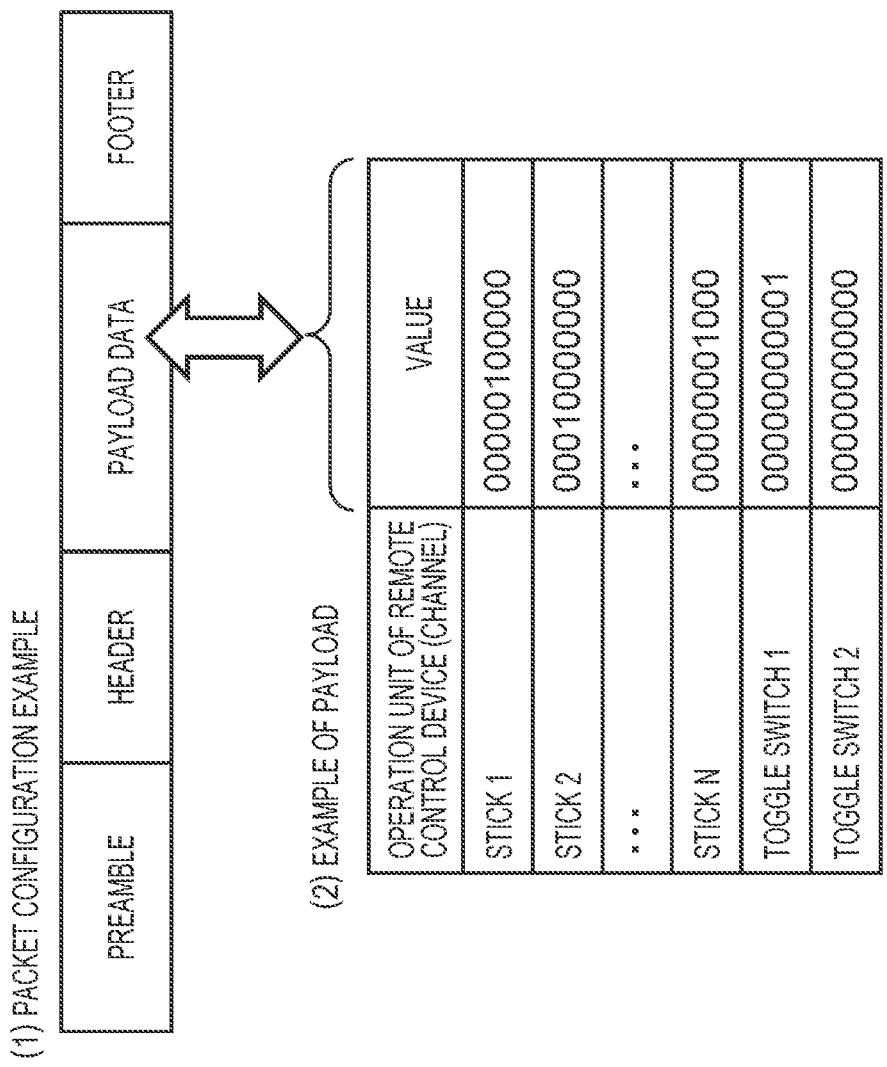
FIG. 4 is a diagram illustrating details of packet generation and transmission processing executed by an instruction generation unit.

Note that transmission packets generated by the instruction generation unit 112 have similar basic configurations regardless of the link unit via which communication is performed, and are constituted by four components: preamble, header, payload data, and footer, as illustrated in FIG. 4.

FIG. 4 illustrates a packet configuration together with an example of control information (instruction information) contained as payload data.

The bit depths of the components of a packet are expressed as
preamble=P [bits],
header=H [bits],
payload data=D [bits] (=data size of control information to be transmitted), and
footer=X [bits].

Regardless of which of a physical layer (PHY) or a data link layer (MAC) is used for the communication processing, a time T [seconds] required to transmit one packet (one frame) can be calculated in accordance with the following equation (Equation 1) on the basis of at least a transfer rate B [bits/second] and the total bit depth (P+H+D+X) of the components of the packet described above.

$$T=(P+H+D+X)/B \qquad \text{(Equation 1)}$$

Note that, as described above, ARIB STD-T108 specifies that the duty ratio of the transmission time should be 1/10 or less for communication in the 920 MHz band that is assumed to be used for long-distance links.

Specifically, for example, the time in which packets can be transmitted is only 0.1 seconds in 1 second.

In order to transmit packets frequently, it is effective to reduce the data size of one packet and shorten the transmission time of one packet.

In view of the above circumstances, the instruction generation unit 112 makes a packet at the time of communication using the long-distance communication wireless link unit 117 to be smaller in data size than a packet at the time of communication using the medium- to short-distance communication wireless link unit 116. Packet size adjustment processing is executed.

In the first embodiment, the data amount of control information (instruction information) contained as payload data is not reduced, but the data amount of overhead components (preamble, header, and footer) other than the payload data is reduced, that is, the bit depth is adjusted.

That is, in a case of communication via the long-distance communication wireless link unit 117 in which the duty ratio of the transmission time needs to be 1/10 or less, the instruction generation unit 112 of the remote control device 110 illustrated in FIG. 3 of the present disclosure generates a packet in which the bit depth in the header of the packet is reduced.

A specific example of a transmission packet generated by the instruction generation unit 112 will be described with reference to FIG. 5.

Figure 5:
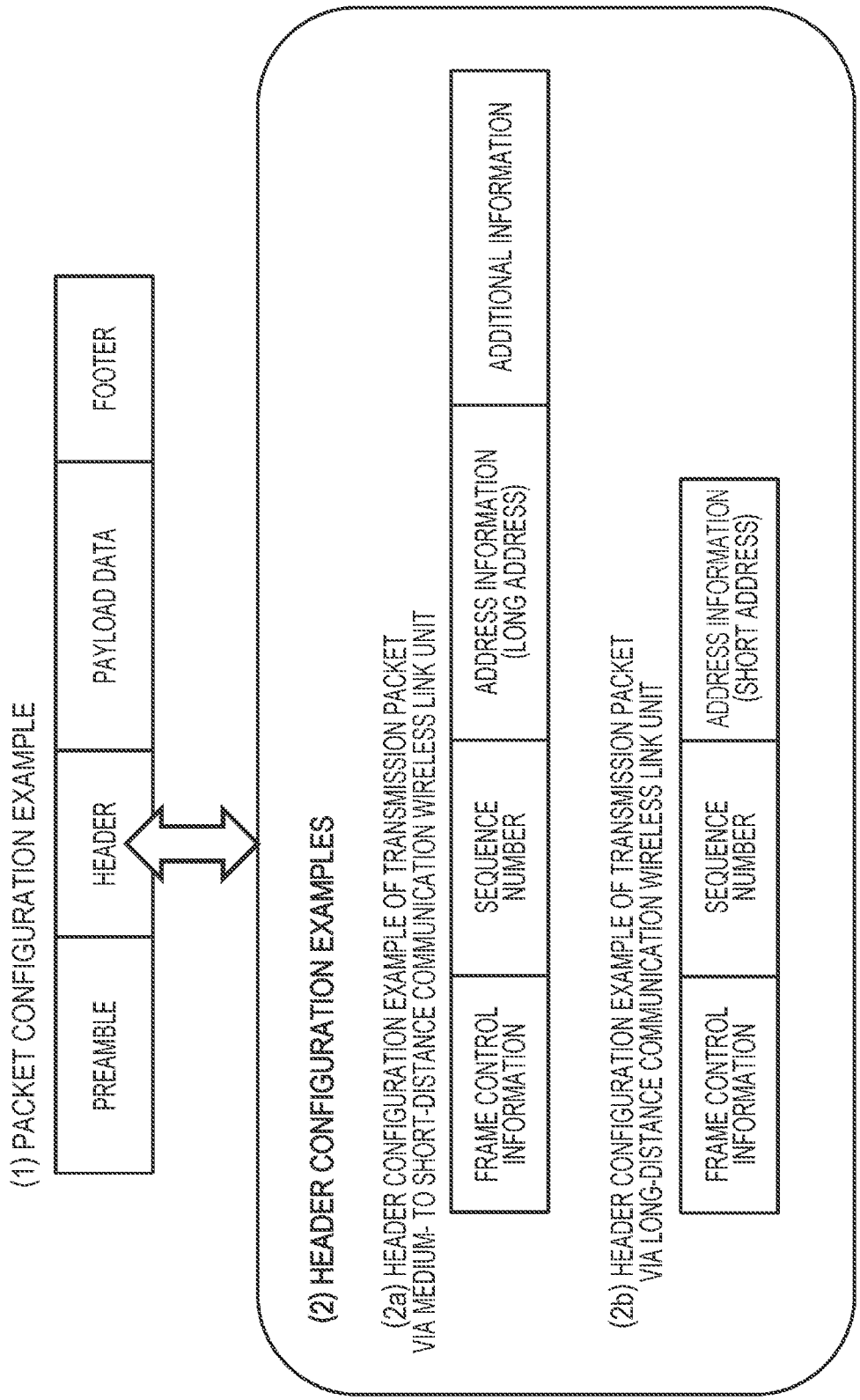
FIG. 5 is a diagram illustrating a specific example of a transmission packet generated by the instruction generation unit.

FIG. 5 illustrates each of the following figures.
(1) Packet configuration
(2) Header configuration examples The (1) packet configuration is similar to the configuration illustrated in FIG. 4(1) described earlier, and is constituted by four components: preamble, header, payload data, and footer.

As the (2) header configuration, two types of header configuration examples:
(2a) a header configuration example of transmission packet via the medium- to short-distance communication wireless link unit 116; and
(2b) a header configuration example of transmission packet via the long-distance communication wireless link unit 117
are illustrated.

As described above, packet transmission via the medium- to short-distance communication wireless link unit 116 is executed by communication processing in a high frequency band such as the 2.4 GHz band. For transmission in this band, there is no regulation that the transmission time duty ratio should be ⅒ or less, and relatively free communication is possible. That is, it is possible to control the moving device 120 by continuously transmitting packets that are large in size to a certain extent.

On the other hand, packet transmission via the long-distance communication wireless link unit 117 is executed by communication processing in a relatively low frequency band such as the 920 MHz band. Transmission in this band is subject to the ARIB regulation that the transmission time duty ratio should be ⅒ or less, and packets need to be transmitted in accordance with this regulation. In order to frequently transmit packets in accordance with this duty ratio regulation, it is necessary to reduce the size of one packet and reduce the time (T) required to transmit one packet.

Thus, as illustrated in FIG. 5(2b), the header of a transmission packet via the long-distance communication wireless link unit 117 is smaller in data size than the header of a transmission packet via the medium- to short-distance communication wireless link unit 116 illustrated in (2a).

The header of the transmission packet via the medium- to short-distance communication wireless link unit 116 illustrated in FIG. 5(2a) has frame control information, a sequence number, address information (long address), and additional information.

On the other hand, the header of the transmission packet via the long-distance communication wireless link unit 117 illustrated in FIG. 5(2b) has frame control information, a sequence number, and address information (short address).

The additional information is, for example, encrypted information. In a case of encrypted communication using IEEE802.15.4 for the PHY/MAC, it is necessary to record "Auxiliary Security Header" as additional information of the header. For example, such information is recorded in the additional information of the header of the transmission packet via the medium- to short-distance communication wireless link unit 116 illustrated in FIG. 2a).

However, as described above, transmission packets via the long-distance communication wireless link unit 117 needs to be transmitted in compliance with the duty ratio regulation. In order to perform frequent packet transmission under this condition and enable fine control of the moving device 120, it is effective to reduce the size of one packet.

On the basis of this, transmission packets via the long-distance communication wireless link unit 117 are set not to be encrypted, and the instruction generation unit 112 of the remote control device 110 illustrated in FIG. 3 of the present disclosure generates packets in which additional information constituted by encrypted information such as "Auxiliary Security Header" is not recorded. This processing reduces the header size.

Moreover, as illustrated in FIG. 5(2), the address information of the header of the transmission packet via the medium- to short-distance communication wireless link unit 116 illustrated in (2a) is a long address, and the address information of the header of the transmission packet via the long-distance communication wireless link unit 117 illustrated in (2b) is a short address.

In this way, the instruction generation unit 112 reduces the address length of transmission packets via the long-distance communication wireless link unit 117 to further reduce the header size of the transmission packets via the long-distance communication wireless link unit 117.

As described previously, the instruction generation unit 112 executes processing of reducing the header size of a transmission packet via the long-distance communication wireless link unit 117 and reducing the packet size of one packet. This packet size reduction processing enables high-frequency packet transmission while complying with ARIB Duty regulations.

As described above, the transmission frequency F [Hz] of packets transmitted by the remote control device 110 to the moving device 120 differs between that at the time of communication using the medium- to short-distance communication wireless link unit 116 on which a duty ratio restriction is not imposed and that at the time of communication using the long-distance communication wireless link unit 117.

In a case of communication using the medium- to short-distance communication wireless link unit 116, the instruction generation unit 112 calculates the packet transmission frequency F (S) [Hz] at the time of communication using the medium- to short-distance communication wireless link unit 116, and generates packets in which operation information input from the input unit 111 is contained as payload data, at an interval specified by the packet transmission frequency F (S) [Hz]. The generated packets have the header illustrated in FIG. 5(2a).

Moreover, the instruction generation unit 112 outputs the generated packets to the medium- to short-distance communication wireless link unit 116. The medium- to short-distance communication wireless link unit 116 transmits the packets to the moving device 120 at the packet transmission frequency F (S) [Hz].

On the other hand, in a case of communication using the long-distance communication wireless link unit 117, the instruction generation unit 112 calculates the packet transmission frequency F (L) [Hz] at the time of communication using the long-distance communication wireless link unit 117, and generates packets in which operation information input from the input unit 111 is contained as payload data, at an interval specified by the packet transmission frequency F (L) [Hz]. The generated packets have the header illustrated in FIG. 5(2b).

Moreover, the instruction generation unit 112 outputs the generated packets to the long-distance communication wireless link unit 117. The long-distance communication wireless link unit 117 transmits the packets to the moving device 120 at the packet transmission frequency F (L) [Hz].

Packet transmission frequency calculation processing executed by the instruction generation unit 112 will be described.

The instruction generation unit 112 calculates, in a case where communication using the medium- to short-distance communication wireless link unit 116 is performed, the packet transmission frequency F (S) [Hz] at the time of communication using the medium- to short-distance communication wireless link unit 116.

The packet transmission frequency F (S) [Hz] at the time of communication using the medium- to short-distance communication wireless link unit 116 can be calculated by the following equation (Equation 2).

$$F(S) = 1/T \qquad \text{(Equation 2)}$$

Note that T in the above (Equation 2) is the time T [seconds] required to transmit one packet (one frame) calculated by the (Equation 1) described earlier. That is, $$T=(P+H+D+X)/B \quad \text{(Equation 1)}$$

It is a value calculated by the above (Equation 1).
P, H, D, and B are the bit depths of the components of a packet, where
preamble=P [bits],
header=H [bits],
payload data=D [bits] (=data size of control information to be transmitted), and
footer=X [bits].

On the other hand, the packet transmission frequency F (L) [Hz] at the time of communication using the long-distance communication wireless link unit 117 can be calculated by the following equation (Equation 3).

$$F(L)=1/(10\times T) \quad \text{(Equation 3)}$$

As described above, communication using the long-distance communication wireless link unit 117 is executed as communication using the 920 MHz communication band. Transmission in this band is subject to the ARIB regulation that the transmission time duty ratio should be 1/10 or less, and packets need to be transmitted in accordance with this regulation.

The above (Equation 3) represents the packet transmission frequency F (L) [Hz] calculated in consideration of this duty ratio regulation.

In this way, depending on which of the medium- to short-distance communication wireless link unit 116 or the long-distance communication wireless link unit 117 is used for communication, the instruction generation unit 112 calculates the corresponding packet transmission frequency F (S) or F (L), and generates packets in which operation information input from the input unit 111 is contained as payload data at an interval in accordance with the calculated packet transmission frequency.

The generated packets have different header configurations depending on the wireless link unit to be used, as described earlier with reference to FIG. 5.

The packets generated by the instruction generation unit 112 are output to the medium- to short-distance communication wireless link unit 116 or the long-distance communication wireless link unit 117, and each of the link units transmits the packets at a different packet transmission interval.

[2-3. Processing Sequence Executed by Remote Control Device]

Figure 6:
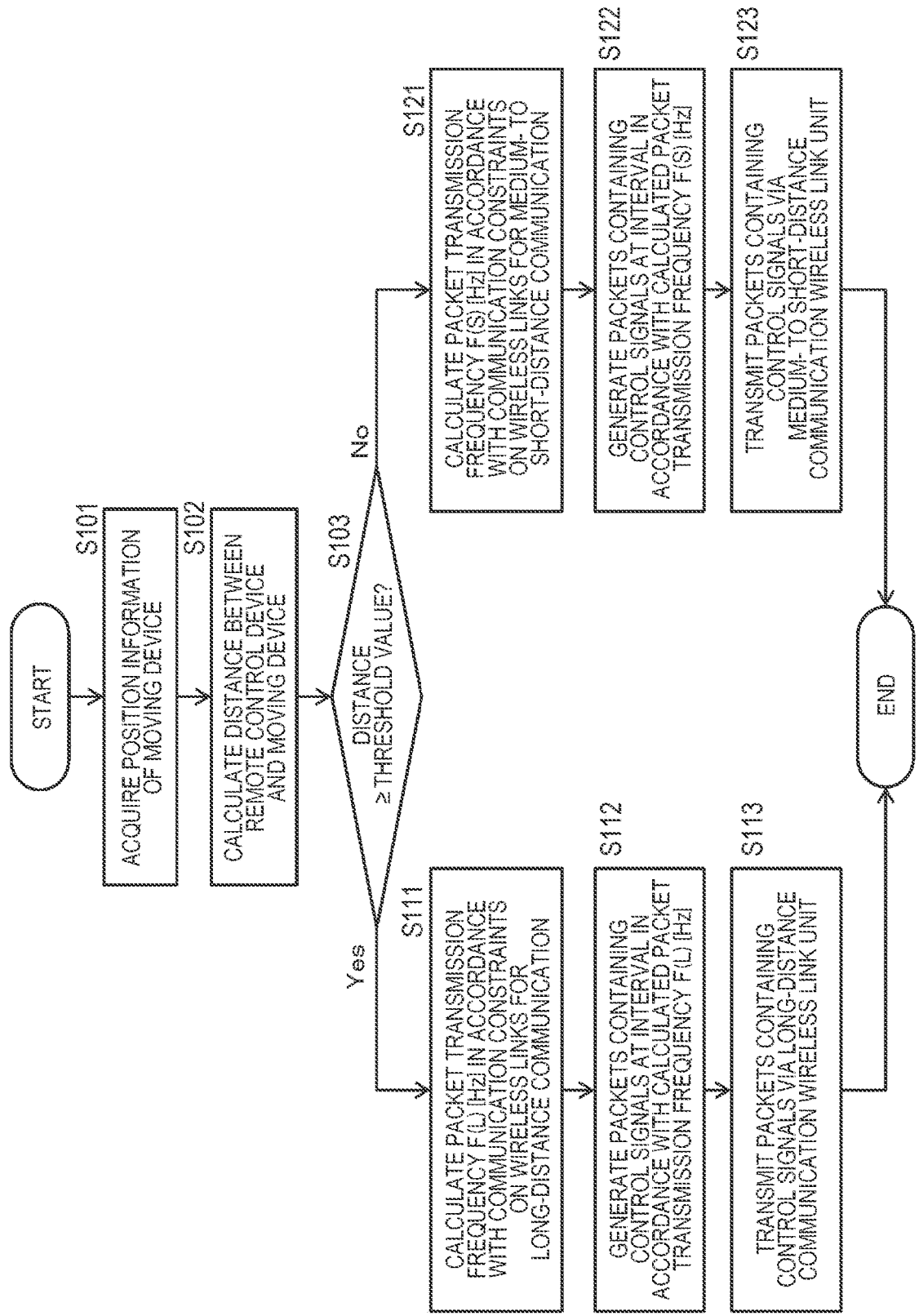
FIG. 6 is a flowchart illustrating a processing sequence executed by the remote control device.

Next, a processing sequence executed by the remote control device 110 will be described with reference to a flowchart illustrated in FIG. 6.

Note that the processing illustrated in the flowchart can be executed under the control of a control unit (data processing unit) having a CPU or the like having a program execution function in accordance with a program contained in a memory of the remote control device 110.

The processing of each step of the flow illustrated in FIG. 6 will be described below.

(Step S101)

First, the remote control device 110 acquires position information of the moving device 120 in step S101.

This processing is executed by the position information acquisition unit 114 of the remote control device 110 illustrated in FIG. 3.

As described above, the moving device 120 calculates the self-position using, for example, a GPS signal as needed, and transmits information regarding the calculated self-position to the remote control device 110.

The position information acquisition unit 114 acquires position information from a packet containing the position information received from the moving device 120.

(Step S102)

Next, the remote control device 110 calculates the distance between the remote control device 110 and the moving device 120 in step S102.

This processing is executed by the wireless link determination unit 113 of the remote control device 110 illustrated in FIG. 3.

For example, the wireless link determination unit 113 calculates the distance between the remote control device 110 and the moving device 120 by calculating the difference between the initial position of the moving device 120 (≈the position of the remote control device 110) and the current position of the moving device 120 acquired in step S101.

Note that, in a case where the remote control device 110 itself has a self-position calculation function such as a calculation function using GPS or the like, the remote control device 110 may use this self-position calculation function to calculate the distance between the remote control device 110 and the moving device 120.

(Step S103)

Next, in step S103, the remote control device 110 determines whether or not the distance between the remote control device 110 and the moving device 120 calculated in step S102 is equal to or greater than a threshold distance (e.g., 1 km) specified in advance.

This processing is also executed by the wireless link determination unit 113 of the remote control device 110 illustrated in FIG. 3.

The wireless link determination unit 113 compares the distance between the remote control device 110 and the moving device 120 with the threshold distance (e.g., 1 km) specified in advance. If the distance between the remote control device 110 and the moving device 120 is equal to or greater than the threshold value, processing of step S111 and the following steps is executed. On the other hand, if the distance is less than the threshold value, the processing of step S121 and the following steps is executed.

(Step S111)

Processing of steps S111 to S113 is executed in a case where it is determined in step S103 that the distance between the remote control device 110 and the moving device 120 is equal to or greater than the threshold value.

In this case, the remote control device 110 first calculates the packet transmission frequency F (L) [Hz] in accordance with communication constraints on wireless links for long-distance communication in step S111.

This processing is executed by the instruction generation unit 112 of the remote control device 110 illustrated in FIG. 3.

As described above, the instruction generation unit 112 generates a packet containing control information to be transmitted via the wireless communication unit 115. That is, a packet in which a control instruction in accordance with user operation information input via the input unit 111 is contained as payload data is generated.

However, as described above, the packet transmission interval in a case of communication using the medium- to short-distance communication wireless link unit 116 and the packet transmission interval in a case of communication using the long-distance communication wireless link unit 117 are different from each other.

It is necessary for the instruction generation unit 112 to execute the communication packet generation processing at a different interval depending on which link unit is used for communication.

In step S111, the packet transmission frequency F (L) [Hz] in a case of communication using the long-distance communication wireless link unit 117 is calculated.

The processing of steps S111 to S113 is executed in a case where it is determined in step S103 that the distance between the remote control device 110 and the moving device 120 is equal to or greater than the threshold value. In this case, the remote control device 110 first calculates the packet transmission frequency F (L) [Hz] in accordance with the communication constraints on wireless links for long-distance communication in step S111.

The packet transmission frequency F (L) [Hz] at the time of communication using the long-distance communication wireless link unit 117 can be calculated by the following equation (Equation 3) as described earlier.

$$F(L)=1/(10 \times T) \quad \text{(Equation 3)}$$

Note that T in the above (Equation 3) is the time T [seconds] required to transmit one packet (one frame) calculated by the (Equation 1) described earlier. That is, $$T=(P+H+D+X)/B \quad \text{(Equation 1)}$$

It is a value calculated by the above (Equation 1).
P, H, D, and B are the bit depths of the components of a packet, where
preamble=P [bits],
header=H [bits],
payload data=D [bits] (=data size of control information to be transmitted), and
footer=X [bits].

In the above (Equation 3), 10 in (10×T) is a parameter in accordance with the ARIB regulation regarding communication using the 920 MHz communication band, that is, the regulation that the transmission time duty ratio should be ⅟₁₀ or less.

In step S111, the instruction generation unit 112 of the remote control device 110 illustrated in FIG. 3 calculates the packet transmission frequency F (L) [Hz] at the time of communication using the long-distance communication wireless link unit 117 in accordance with the above (Equation 3).

(Step S112)

Next, in step S112, the remote control device 110 generates packets at an interval in accordance with the packet transmission frequency F (L) [Hz] in accordance with the communication constraints on wireless links for long-distance communication calculated in step S111.

This processing is also executed by the instruction generation unit 112 of the remote control device 110 illustrated in FIG. 3.

The instruction generation unit 112 generates packets in which operation information input from the input unit 111 is contained as payload data, at an interval specified by the packet transmission frequency F (L) [Hz] calculated in step S111.

Note that the generated packets have the header illustrated in FIG. 5(2b).

That is, packets that are smaller in packet size than packets transmitted via the medium- to short-distance communication wireless link unit 116 are generated.

(Step S113) Next, in step S113, the remote control device 110 transmits the packets generated in step S112 via the long-distance communication wireless link unit 117.

This processing is executed by the instruction generation unit 112 and the long-distance communication wireless link unit 117 of the remote control device 110 illustrated in FIG. 3.

The instruction generation unit 112 outputs the packets generated in step S112 to the long-distance communication wireless link unit 117. The long-distance communication wireless link unit 117 transmits the packets to the moving device 120 at the packet transmission frequency F (L) [Hz] calculated in step S111.

(Step S121)

Next, processing of steps S121 to S123 will be described.

The processing of steps S121 to S123 is executed in a case where it is determined in step S103 that the distance between the remote control device 110 and the moving device 120 is less than the threshold value.

In this case, the remote control device 110 first calculates the packet transmission frequency F (S) [Hz] in accordance with communication constraints on wireless links for medium- to short-distance communication in step S121.

This processing is executed by the instruction generation unit 112 of the remote control device 110 illustrated in FIG. 3.

As described above, the instruction generation unit 112 generates a packet containing control information to be transmitted via the wireless communication unit 115. That is, a packet in which a control instruction in accordance with user operation information input via the input unit 111 is contained as payload data is generated.

However, as described above, the packet transmission interval in a case of communication using the medium- to short-distance communication wireless link unit 116 and the packet transmission interval in a case of communication using the medium- to short-distance communication wireless link unit 116 are different from each other.

It is necessary for the instruction generation unit 112 to execute the communication packet generation processing at a different interval depending on which link unit is used for communication.

In step S121, the packet transmission frequency F (S) [Hz] in a case of communication using the medium- to short-distance communication wireless link unit 116 is calculated.

The processing of steps S121 to S123 is executed in a case where it is determined in step S103 that the distance between the remote control device 110 and the moving device 120 is less than the threshold value. In this case, the remote control device 110 first calculates the packet transmission frequency F (S) [Hz] in accordance with the communication constraints on wireless links for medium- to short-distance communication in step S121.

The packet transmission frequency F (S) [Hz] at the time of communication using the medium- to short-distance communication wireless link unit 116 can be calculated by the following equation (Equation 2) as described earlier.

$$F(S)=1/T \quad \text{(Equation 2)}$$

Note that T in the above (Equation 2) is the time T [seconds] required to transmit one packet (one frame) calculated by the (Equation 1) described earlier. That is, $$T=(P+H+D+X)/B \quad \text{(Equation 1)}$$

It is a value calculated by the above (Equation 1).
P, H, D, and B are the bit depths of the components of a packet, where
preamble=P [bits],
header=H [bits], payload data=D [bits] (=data size of control information to be transmitted), and footer=X [bits].

In step S121, the instruction generation unit 112 of the remote control device 110 illustrated in FIG. 3 calculates the packet transmission frequency F (S) [Hz] at the time of communication using the medium- to short-distance communication wireless link unit 116 in accordance with the above (Equation 2).

(Step S122)

Next, in step S122, the remote control device 110 generates packets at an interval in accordance with the packet transmission frequency F (S) [Hz] in accordance with the communication constraints on wireless links for medium- to short-distance communication calculated in step S121.

This processing is also executed by the instruction generation unit 112 of the remote control device 110 illustrated in FIG. 3.

The instruction generation unit 112 generates packets in which operation information input from the input unit 111 is contained as payload data, at an interval specified by the packet transmission frequency F (S) [Hz] calculated in step S111.

Note that the generated packets have the header illustrated in FIG. 5(2a).

That is, packets that are larger in packet size than packets transmitted via the long-distance communication wireless link unit 117 are generated.

(Step S123)

Next, in step S123, the remote control device 110 transmits the packets generated in step S122 via the medium- to short-distance communication wireless link unit 116.

This processing is executed by the instruction generation unit 112 of the remote control device 110 and the medium- to short-distance communication wireless link unit 116 illustrated in FIG. 3.

The instruction generation unit 112 outputs the packets generated in step S122 to the medium- to short-distance communication wireless link unit 116. The medium- to short-distance communication wireless link unit 116 transmits the packets to the moving device 120 at the packet transmission frequency F (S) [Hz] calculated in step S121.

In this way, the remote control device of the present disclosure determines whether or not the distance between the remote control device 110 and the moving device 120 is equal to or greater than the threshold value. If it is determined that the distance is equal to or greater than the threshold value, packets that are small in packet size are generated and transmitted at the packet transmission frequency F (L) [Hz] in accordance with the communication constraints on wireless links for long-distance communication.

On the other hand, if the distance between the remote control device 110 and the moving device 120 is less than the threshold value, packets that are relatively large in packet size are generated and transmitted at the packet transmission frequency F (S) [Hz] in accordance with the communication constraints on wireless links for medium- to short-distance communication.

According to these pieces of processing, packets containing control signals can be transmitted to the device 120 at least at a certain frequency, both in a case where the distance between the remote control device 110 and the moving device 120 is equal to or greater than the threshold value and in a case where the distance is less than the threshold value, and this enables fine control.

[2-4. Processing Sequence Executed by Moving Device]

Figure 7:
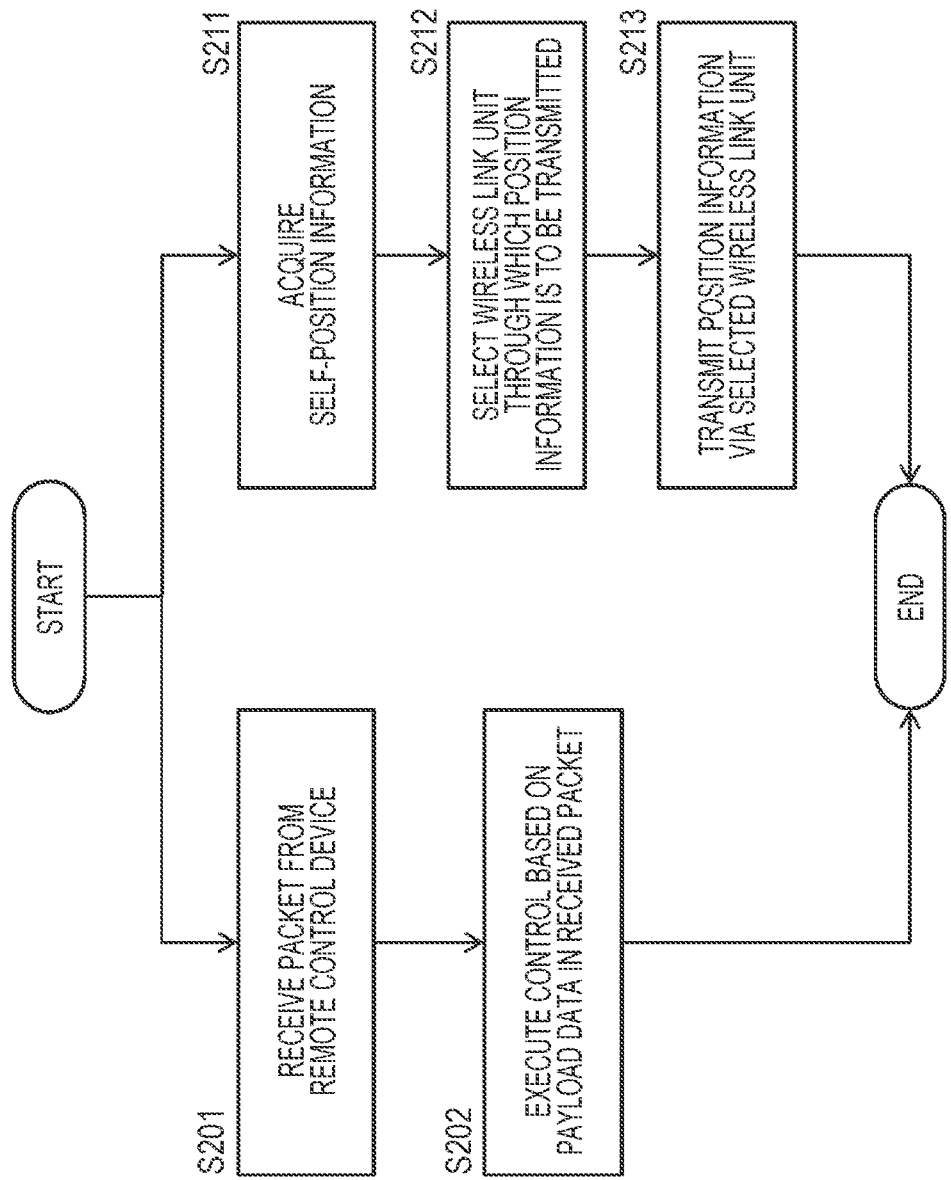
FIG. 7 is a flowchart illustrating a processing sequence executed by the moving device.

Next, a processing sequence executed by the moving device 120 will be described with reference to a flowchart illustrated in FIG. 7.

Note that the processing illustrated in the flowchart can be executed under the control of a control unit (data processing unit) having a CPU or the like having a program execution function in accordance with a program contained in a memory of the moving device 120.

The processing of each step of the flow illustrated in FIG. 7 will be described below.

(Step S201)

Processing of steps S201 and S202 and processing of steps S211 to S213 are executed in parallel by the moving device 120.

First, the processing of steps S201 and S202 will be described.

In step S201, the moving device 120 receives a packet containing control information (instruction information) from the remote control device 110.

This processing is executed by the wireless communication unit 126 of the moving device 120 illustrated in FIG. 3. Note that the wireless communication unit 126 of the moving device 120 includes the medium- to short-distance communication wireless link unit 127 and the long-distance communication wireless link unit 128.

As described earlier with reference to the flow in FIG. 6, the remote control device 110 transmits a packet via a wireless link for long-distance communication if the distance between the remote control device 110 and the moving device 120 is equal to or greater than the threshold value, and transmits a packet via a wireless link for medium- to short-distance communication if the distance is less than the threshold value.

In the wireless communication unit 126 of the moving device 120, in a case where the remote control device 110 has transmitted a packet via a wireless link for long-distance communication, the long-distance communication wireless link unit 128 receives the packet.

Furthermore, in a case where the remote control device 110 has transmitted a packet via a wireless link for medium- to short-distance communication, the medium- to short-distance communication wireless link unit 127 receives the packet.

The packet received by the medium- to short-distance communication wireless link unit 127 or the long-distance communication wireless link unit 128 of the wireless communication unit 126 is transferred to the instruction acquisition unit 123.

(Step S202)

Next, in step S202, the moving device 120 executes control based on the control information (instruction information) contained as payload data in the received packet.

This processing is executed by the instruction acquisition unit 123 and the flight control unit 122 of the moving device 120 illustrated in FIG. 3.

The instruction acquisition unit 123 of the moving device 120 acquires the control information (instruction information) contained as payload data in the packet received by the medium- to short-distance communication wireless link unit 127 or the long-distance communication wireless link unit 128 of the wireless communication unit 126, and outputs the control information (instruction information) to the flight control unit 122.

The flight control unit 122 controls the moving device 120 in accordance with the control information (instruction information). Specifically, controls regarding ascending, descending, the traveling direction, and the like are executed. Note that imaging by a camera may be controlled in some cases.

(Step S211)

Next, the processing of steps S211 to S213 will be described.

In step S211, the moving device 120 acquires information regarding the self-position of the moving device 120 itself.

This processing is executed by the position information generation unit 124 of the moving device 120 illustrated in FIG. 3.

The position information generation unit 124 generates position information indicating the current position of the moving device 120. For example, the self-position is acquired on the basis of a signal received from a GPS satellite or the like.

Alternatively, the self-position may be calculated by self-position estimation by simultaneous localization and mapping (SLAM).

The position information generated by the position information generation unit 124 is output to the position information notification unit 125.

(Step S212)

Next, in step S212, the moving device 120 selects a wireless link unit through which the position information acquired in step S211 is to be transmitted.

This processing is executed by the wireless link determination unit 121 of the moving device 120 illustrated in FIG. 3.

The wireless link determination unit 121 determines which of the medium- to short-distance communication wireless link unit 127 or the long-distance communication wireless link unit 128 is to be used to transmit the position information to the remote control device 110.

The wireless link determination unit 121 selects, for example, the link unit that has received the latest packet from the remote control device 110 as a communication unit to be used for transmitting the packet containing the position information.

(Step S213)

Next, in step S213, the moving device 120 transmits the position information acquired in step S211 to the remote control device 110 via the wireless link unit selected in step S212.

This processing is executed by the position information notification unit 125 and the wireless communication unit 126 of the moving device 120 illustrated in FIG. 3.

The position information notification unit 125 generates a packet that contains the position information indicating the current position of the moving device 120 generated by the position information generation unit 124, and transmits the packet to the remote control device 110 via one of the medium- to short-distance communication wireless link unit 127 or the long-distance communication wireless link unit 128 of the wireless communication unit 126, that is, the link unit selected in step S212.

3. Configuration and Processing of Second Embodiment of Present Disclosure

Next, a configuration and processing of a second embodiment of the present disclosure will be described with reference to FIG. 8 and the following figures.

As described earlier, ARIB STD-T108 specifies that the duty ratio of the transmission time should be $\frac{1}{10}$ or less for communication in the 920 MHz band that is assumed to be used for long-distance links.

Specifically, for example, the time in which packets can be transmitted is only 0.1 seconds in 1 second.

In order to transmit packets frequently, it is effective to reduce the data size of one packet and shorten the transmission time of one packet.

Thus, an instruction generation unit 112 of a remote control device 110 of the present disclosure generates a packet at the time of communication using a long-distance communication wireless link unit 117 as a packet of a data size smaller than that of a packet at the time of communication using a medium- to short-distance communication wireless link unit 116.

In the first embodiment described previously, as described earlier with reference to FIG. 5, the amount of data in the header of a packet is set to be reduced for the purpose of reducing the size of the packet transmitted via a long-distance link.

On the other hand, the second embodiment described below is an example of reducing data related to control information (instruction information) contained as payload data.

For example, in a case where an abnormality has occurred in a moving device 120, processing is performed in which control information (instruction information) to be transmitted from the remote control device 110 is narrowed down to flight-related instructions.

For example, information regarding control of imaging by a camera or the like is not included but only flight control information is contained as payload data, so that the data amount of payload data in a packet is reduced.

This processing reduces the size of packets to be transmitted via long-distance links. Reducing the packet size makes it possible to transmit packets frequently while complying with the ARIB regulation that the transmission time duty ratio should be $\frac{1}{10}$ or less, thereby allowing for normal movement (flight) control of the moving device 120.

[3-1. Configuration Example of Remote Control Device and Moving Device]

First, a configuration example of the remote control device 110 and the moving device 120 of the second embodiment will be described with reference to FIG. 8.

Figure 8:
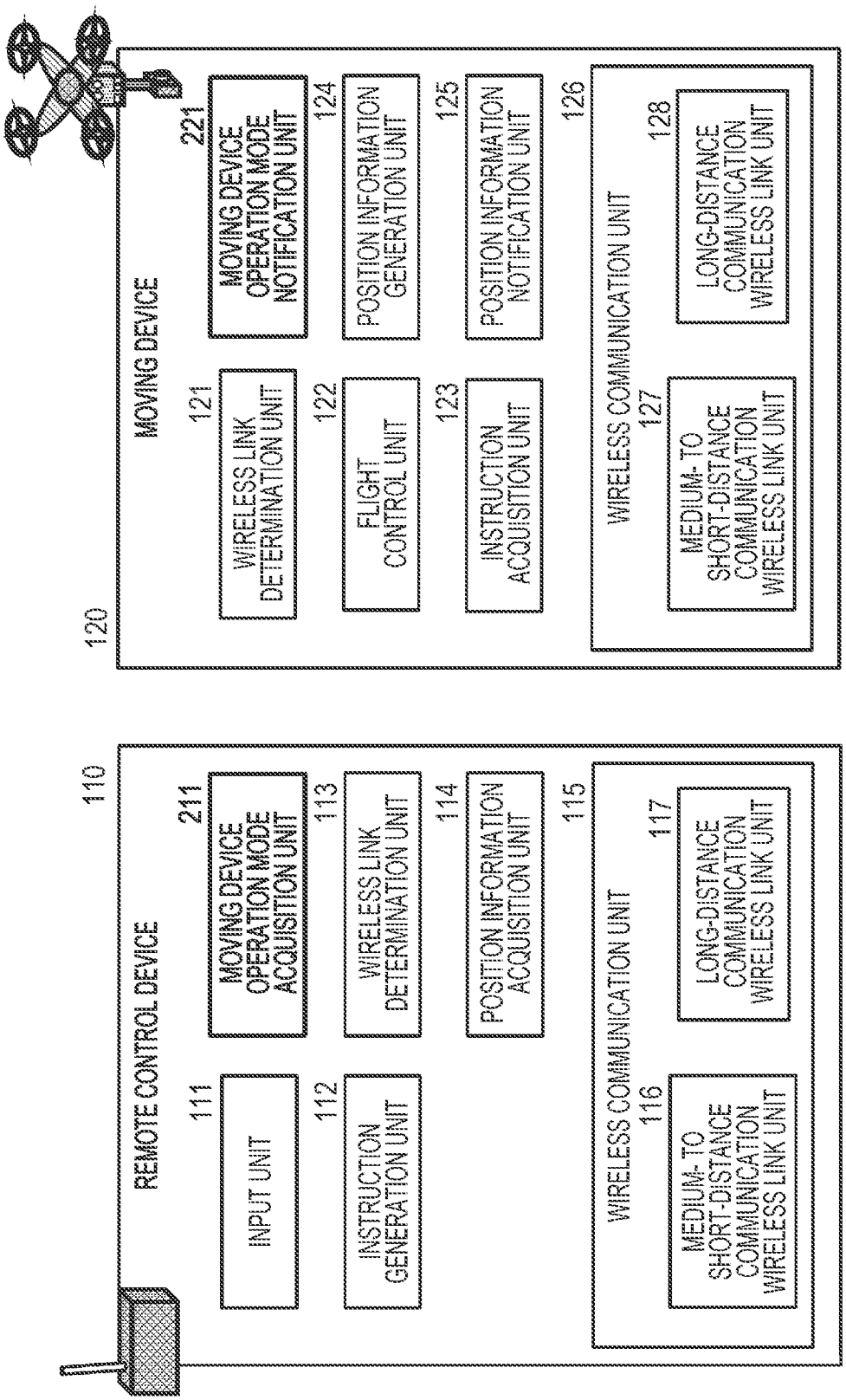
FIG. 8 is a block diagram illustrating configurations of a remote control device and a moving device of a second embodiment.

FIG. 8 is a block diagram illustrating configurations of the remote control device 110 and the moving device 120 of the second embodiment.

The remote control device 110 includes an input unit 111, the instruction generation unit 112, a wireless link determination unit 113, a position information acquisition unit 114, a wireless communication unit 115, and a moving device operation mode acquisition unit 211.

The wireless communication unit 115 includes the medium- to short-distance communication wireless link unit 116 and the long-distance communication wireless link unit 117.

The remote control device 110 of the second embodiment has a configuration in which the moving device operation mode acquisition unit 211 is added to the remote control device 110 of the first embodiment described earlier with reference to FIG. 3.

Furthermore, the instruction generation unit 112 executes processing different from that in the first embodiment.

The moving device operation mode acquisition unit 211 acquires an operation mode of the moving device 120. The acquisition is performed by a method in which notification information is received from the moving device 120 via the wireless communication unit 115. Alternatively, a method may be used in which a color or light emission pattern of an LED or the like provided in the moving device 120 is detected, and then an operation mode of the moving device 120 is acquired on the basis of information regarding the detection.

In a case where the moving device operation mode acquisition unit 211 has detected an abnormality in the moving device 120, information regarding the detection is input to the instruction generation unit 112.

When information regarding an abnormality in the moving device 120 is input from the moving device operation mode acquisition unit 211, the instruction generation unit 112 performs processing of narrowing down control information (instruction information) to be contained in a packet to be transmitted to the moving device 120 to only information regarding flight control of the moving device 120. For example, processing is performed in which control information (instruction information) regarding control of image capturing by a camera or the like is not contained in the packet. Moreover, it is also possible to perform processing of making a packet contain only some of all inputs from sticks and buttons constituting the input unit 111 predetermined in accordance with an aircraft operation mode.

The moving device 120 of the second embodiment illustrated in FIG. 8 includes a wireless link determination unit 121, a flight control unit 122, an instruction acquisition unit 123, a position information generation unit 124, a position information notification unit 125, a wireless communication unit 126, and a moving device operation mode notification unit 221.

The wireless communication unit 126 includes a medium- to short-distance communication wireless link unit 127 and a long-distance communication wireless link unit 128.

The moving device 120 of the second embodiment illustrated in FIG. 8 has a configuration in which the moving device operation mode notification unit 221 is added to the moving device 120 of the first embodiment described earlier with reference to FIG. 3.

The moving device operation mode notification unit 221 executes processing of notifying the remote control device 110 of the operation mode of the moving device 120, such as a notification of an abnormality in the moving device 120.

The moving device operation mode notification unit 221 transmits, for example, operation mode information such as an abnormal state of the moving device 120 to the remote control device 110 via the wireless communication unit 126. Alternatively, a color or light emission pattern of an LED or the like may be output so that the remote control device 110 is notified of operation mode information such as an abnormal state of the moving device 120.

[3-2. Details of Packet Generation and Transmission Processing Executed by Instruction Generation Unit]

Next, details of the packet generation and transmission processing executed by the instruction generation unit 112 of the remote control device 110 of the second embodiment will be described.

As described above, the instruction generation unit 112 generates a packet containing control information to be transmitted via the wireless communication unit 115. That is, a packet in which a control instruction in accordance with user operation information input via the input unit 111 is contained as payload data is generated.

ARIB STD-T108 specifies that the duty ratio of the transmission time should be $1/10$ or less for communication in the 920 MHz band that is assumed to be used for long-distance links. Thus, the instruction generation unit 112 of the remote control device 110 of the present disclosure generates a packet at the time of communication using the long-distance communication wireless link unit 117 as a packet of a data size smaller than that of a packet at the time of communication using the medium- to short-distance communication wireless link unit 116.

In the first embodiment described previously, as described earlier with reference to FIG. 5, the amount of data in the header of a packet is set to be reduced for the purpose of reducing the size of the packet transmitted via a long-distance link. On the other hand, in the second embodiment, the control information (instruction information) contained as payload data is reduced.

For example, in a case where an abnormality has occurred in the moving device 120, processing is performed in which control information (instruction information) to be transmitted from the remote control device 110 is narrowed down to flight-related instructions.

For example, information regarding control of imaging by a camera or the like is not included but only flight control information is contained as payload data, so that the data amount of payload data in a packet is reduced.

A specific example of a transmission packet generated by the instruction generation unit 112 will be described with reference to FIG. 9.

Figure 9:
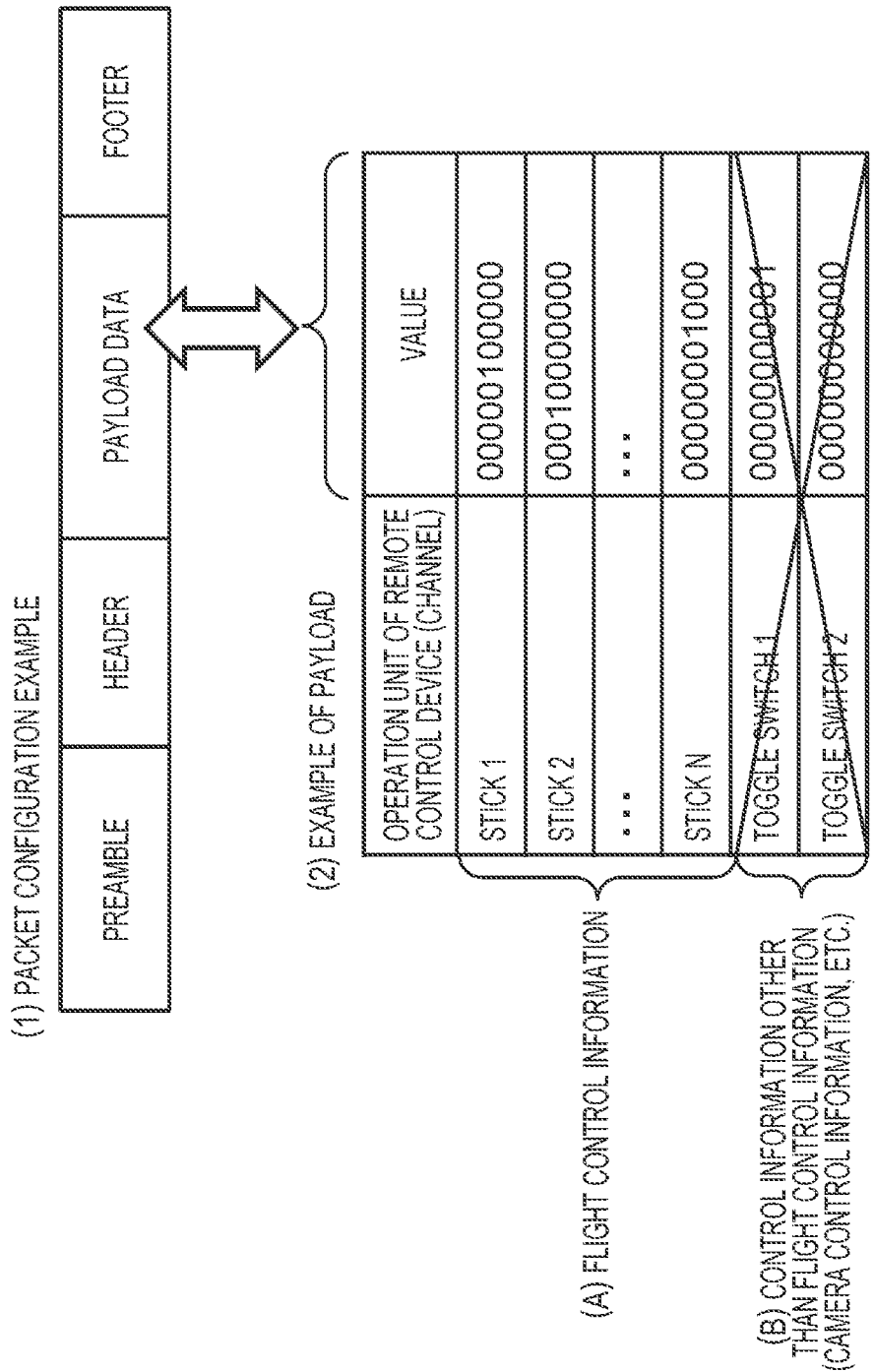
FIG. 9 is a diagram illustrating a specific example of a transmission packet generated by an instruction generation unit.

FIG. 9 illustrates a configuration of a transmission packet generated by the instruction generation unit 112.

The basic configuration of the transmission packet illustrated in FIG. 9 is similar to the packet configuration described earlier with reference to FIG. 4, and is constituted by four components: preamble, header, payload data, and footer.

FIG. 9 illustrates a packet configuration together with an example of control information (instruction information) contained as payload data.

Control information (instruction information) contained as payload data is roughly classified into the following two types.

(A) Flight control information
(B) Control information other than flight control information (camera control information and the like)

In the present embodiment, if an abnormality in the moving device 120 has been detected when a long-distance link in which the duty ratio of the transmission time is specified to be $1/10$ or less is used, the instruction generation unit 112 of the remote control device 110 performs processing of narrowing down payload data to be contained in packets to only the above "(A) flight control information".

That is, "(B) control information other than flight control information (camera control information and the like)" is set not to be contained in packets.

This processing reduces the packet data size and makes it possible to increase the frequency of sending packets even when a long-distance link in which the duty ratio of the transmission time is specified to be $1/10$ or less is used, and it is possible to maintain safe flight of the moving device 120.

That is, reducing the payload data and reducing the packet size make it possible to transmit packets frequently while complying with the ARIB regulation that the transmission time duty ratio should be $1/10$ or less, thereby allowing for normal movement (flight) control of the moving device 120.

In the second embodiment, the time T [seconds] required to transmit one packet (one frame) at the time of communication using the long-distance communication wireless link unit 117 is calculated by the following (Equation 4).

$$T=(P+H+D2+X)/B \quad \text{(Equation 4)}$$

P, H, D2, and B are the bit depths of the components of a packet, where
preamble=P [bits],
header=H [bits],
payload data=D2 [bits] (=data size of control information to be transmitted), and
footer=X [bits].

The payload data=D2 corresponds to the data amount of (A) flight control information only described with reference to FIG. 9. That is, the payload data=D2 is the bit depth of payload data that does not include "(B) control information other than flight control information (camera control information and the like)" after the amount of data has been reduced.

With the use of the time T [seconds] calculated in accordance with the above (Equation 4), that is, the time T [seconds] required to transmit one packet (one frame) at the time of communication using the long-distance communication wireless link unit 117, the transmission frequency F (L2) [Hz] at the time of communication using the long-distance communication wireless link unit 117 can be calculated by the following equation (Equation 5).

$$F(L2)=1/(10\times(P+H+D2+X)/B)=1/(10\times T) \quad \text{(Equation 5)}$$

As described above, communication using the long-distance communication wireless link unit 117 is executed as communication using the 920 MHz communication band. As a restrictive regulation related to transmission in this band, the ARIB regulation that the transmission time duty ratio should be 1/10 or less has been imposed, and packets need to be transmitted in accordance with this regulation.

The above (Equation 5) represents the packet transmission frequency F (L2) [Hz] calculated in consideration of this duty ratio regulation.

In the present embodiment, limiting the data contained as payload data in a packet to flight control information to reduce the packet size in this way makes it possible to increase the packet transmission frequency even in a case of communication via the long-distance communication wireless link unit 117, and this enables fine control of the moving device 120.

[3-3. Processing Sequence Executed by Remote Control Device]

Next, a processing sequence executed by the remote control device 110 in the second embodiment will be described with reference to a flowchart illustrated in FIG. 10.

Note that, in the flow illustrated in FIG. 10, each piece of processing of steps S101 to S103, steps S111 to S113, and steps S121 to S123 is similar to the processing described with reference to the flow illustrated in FIG. 6 in the first embodiment described earlier, and the description thereof will be omitted.

Figure 10:
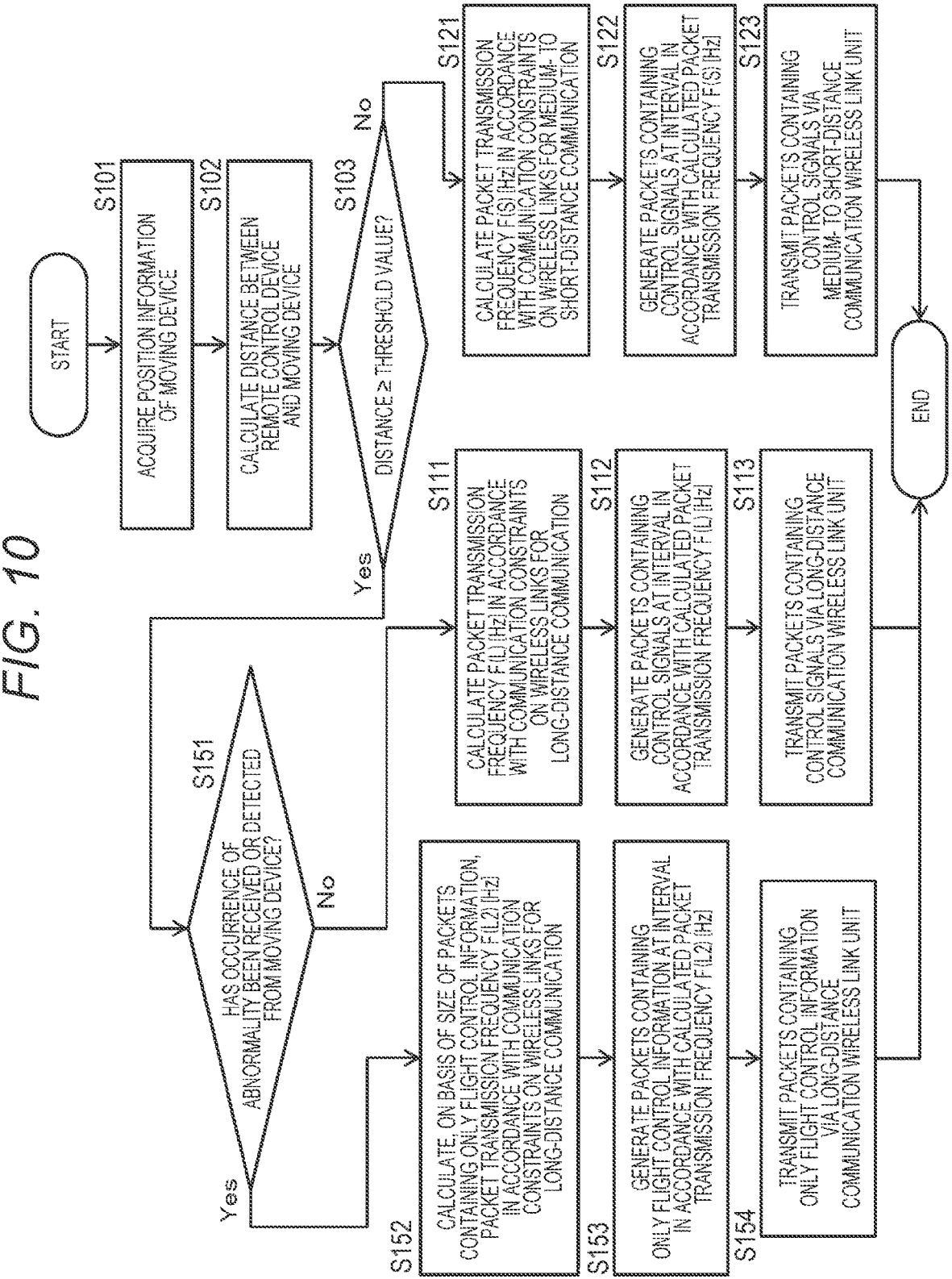
FIG. 10 is a flowchart illustrating a processing sequence executed by the remote control device.

In the flow illustrated in FIG. 10, processing of steps S151 to S154 is specific to the second embodiment. Details of these pieces of processing will be described below.

(Step S151)

Step S151 is processing to be executed in a case where it is determined in step S103 that the distance between the remote control device 110 and the moving device 120 is equal to or greater than the threshold value.

In this case, the remote control device 110 determines in step S151 whether or not occurrence of an abnormality in the moving device 120 has been received or detected.

As described above, occurrence of an abnormality in the moving device 120 is acquired by, for example, a method in which operation mode information is received from the moving device 120 via the wireless communication unit 115, or a color or light emission pattern of an LED or the like provided in the moving device 120 is detected, and then an operation mode of the moving device 120 is acquired on the basis of information regarding the detection.

In a case where the moving device operation mode acquisition unit 211 has detected an abnormality in the moving device 120, information regarding the detection is input to the instruction generation unit 112.

In this case, the determination in step S151 is Yes, and the processing proceeds to step S152.

On the other hand, in a case where the moving device operation mode acquisition unit 211 has not detected an abnormality in the moving device 120, the determination in step S151 is No, and the processing proceeds to step S111. The processing of steps S111 to S113 is similar to the processing described with reference to the flow in FIG. 6 in the first embodiment described earlier.

(Step S152)

Processing of steps S152 to S154 is executed in a case where it is determined in step S103 that the distance between the remote control device 110 and the moving device 120 is equal to or greater than the threshold value, and then an abnormality in the moving device 120 has been detected in step S151.

In this case, the remote control device 110 first calculates, on the basis of the packet size of a packet containing only flight control information, the packet transmission frequency F (L2) [Hz] in accordance with the communication constraints on wireless links for long-distance communication in step S152.

This processing is executed by the instruction generation unit 112 of the remote control device 110 illustrated in FIG. 8.

As described above, the instruction generation unit 112 generates a packet containing control information to be transmitted via the wireless communication unit 115. That is, a packet in which a control instruction in accordance with user operation information input via the input unit 111 is contained as payload data is generated.

However, in an emergency, that is, in a case where an abnormality has occurred in flight of the moving device 120 or the like, the instruction generation unit 112 generates a packet containing only flight control information without including, for example, control information related to imaging by a camera, so that the packet size is reduced. That is, data related to control information (instruction information) contained as payload data is reduced.

Reducing the packet size makes it possible to transmit packets frequently while complying with the ARIB regulation that the transmission time duty ratio should be 1/10 or less, thereby allowing for normal movement (flight) control of the moving device 120.

In step S152, the packet transmission frequency F (L2) [Hz] in a case of communication using the long-distance communication wireless link unit 117 is calculated on the basis of the packet size of a packet containing only flight control information.

In a packet containing only flight control information, the payload data size is reduced as described earlier with reference to FIG. 9.

The data size of the payload data is expressed as D2. On the basis of the packet size of the packet with reduced payload data, the packet transmission frequency F (L2) [Hz] at the time of communication using the long-distance communication wireless link unit 117 is calculated. As described earlier, the following equation (Equation 5) can be used for the calculation.

$$F(L2)=1/(10\times(P+H+D2+X)/B)=1/(10\times T) \quad \text{(Equation 5)}$$

Note that T in the above (Equation 5) is the time T [seconds] required to transmit one packet (one frame) calculated by the (Equation 4) described earlier. That is, $$T=(P+H+D2+X)/B \quad \text{(Equation 4)}$$

It is a value calculated by the above (Equation 4).

P, H, D2, and B are the bit depths of the components of a packet, where preamble=P [bits],
header=H [bits],
payload data=D2 [bits] (=data size of control information to be transmitted), and
footer=X [bits].

The payload data=D2 [bits] in the above (Equation 4) and (Equation 5) is the bit depth of the payload data constituted only by flight control information (flight instruction information).

Furthermore, in the above (Equation 5), 10 in (10×T) is a parameter in accordance with the ARIB regulation regarding communication using the 920 MHz communication band, that is, the regulation that the transmission time duty ratio should be 1/10 or less.

In step S152, the instruction generation unit 112 of the remote control device 110 illustrated in FIG. 8 calculates the packet transmission frequency F (L2)[Hz] at the time of communication using the long-distance communication wireless link unit 117 in accordance with the above (Equation 5).

(Step S153)

Next, in step S153, the remote control device 110 generates packets at an interval in accordance with the packet transmission frequency F (L2) [Hz] in accordance with the communication constraints on wireless links for long-distance communication calculated in step S152.

This processing is also executed by the instruction generation unit 112 of the remote control device 110 illustrated in FIG. 8.

The instruction generation unit 112 selectively acquires only the flight control information from the operation information input from the input unit 111 at an interval specified by the packet transmission frequency F (L2) [Hz] calculated in step S152, and generates packets containing only the selectively acquired flight control information as payload data.

Note that the generated packets have the header illustrated in FIG. 5(2b), and contain, as payload data, only flight control information as described with reference to FIG. 9.

The packet size is smaller than that of packets transmitted via the medium- to short-distance communication wireless link unit 116.

(Step S154)

Next, in step S154, the remote control device 110 transmits the packets generated in step S153 via the long-distance communication wireless link unit 117.

This processing is executed by the instruction generation unit 112 and the long-distance communication wireless link unit 117 of the remote control device 110 illustrated in FIG. 8.

The instruction generation unit 112 outputs the packets generated in step S153 to the long-distance communication wireless link unit 117. The long-distance communication wireless link unit 117 transmits the packets to the moving device 120 at the packet transmission frequency F (L) [Hz] calculated in step S111.

Limiting the data contained as payload data in a packet to flight control information to reduce the packet size in this way makes it possible to increase the packet transmission frequency even in a case of communication via the long-distance communication wireless link unit 117, and this enables fine control of the moving device 120.

[3-4. Processing Sequence Executed by Moving Device]

Next, a processing sequence executed by the moving device 120 in the second embodiment will be described with reference to a flowchart illustrated in FIG. 11.

Note that, in the flow illustrated in FIG. 11, each piece of processing of steps S201 and S202 and steps S211 to S213 is similar to the processing described with reference to the flow illustrated in FIG. 7 in the first embodiment described earlier, and the description thereof will be omitted.

Figure 11:
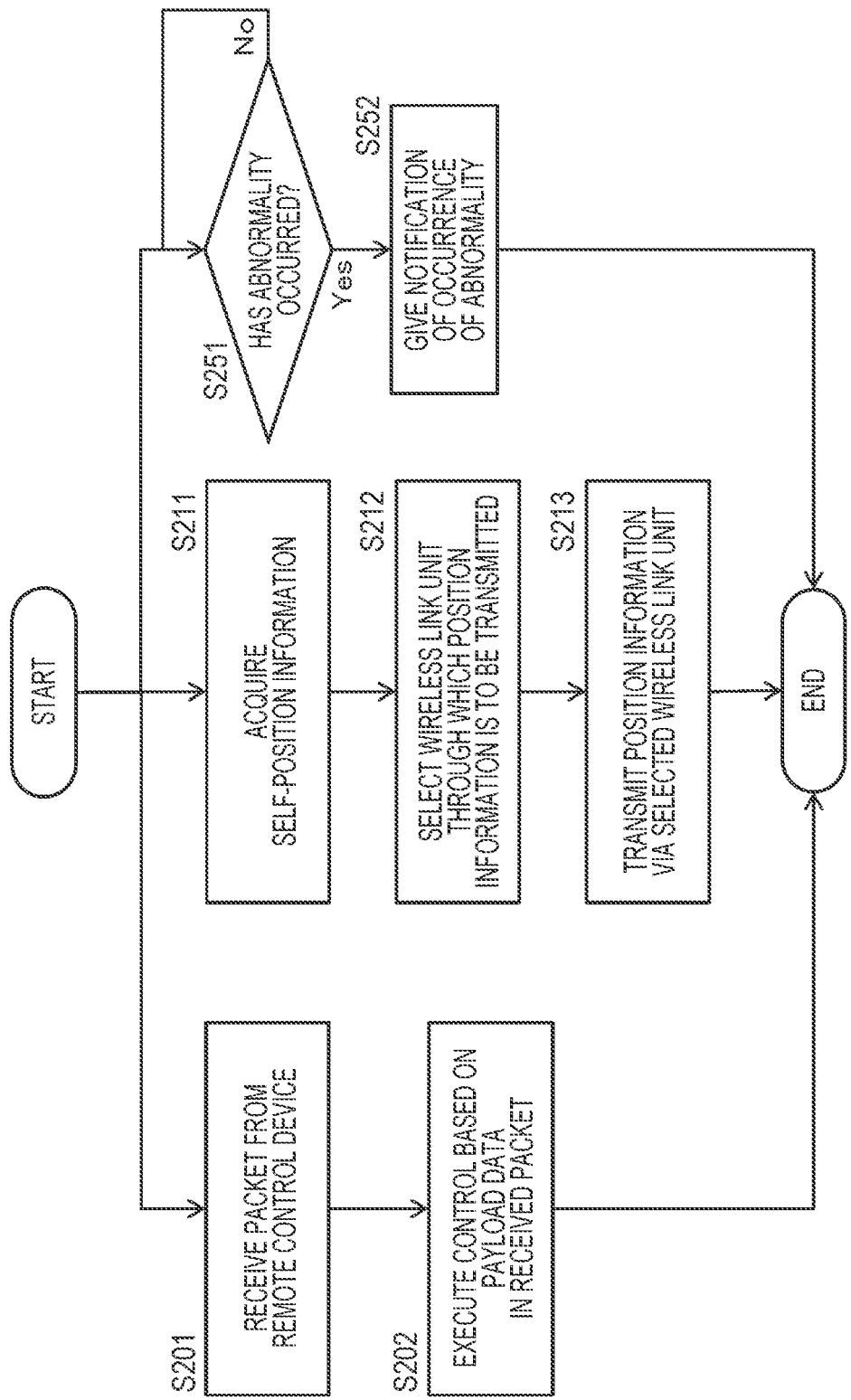
FIG. 11 is a flowchart illustrating a processing sequence executed by the moving device.

In the flow illustrated in FIG. 11, processing of steps S251 and S252 is specific to the second embodiment. Details of these pieces of processing will be described below.

(Step S251)

The processing of steps S251 and S252 described below is executed in parallel with the processing of steps S201 and S202 and the processing of steps S211 to S213 by the moving device 120.

The processing of steps S201 and S202 and the processing of steps S211 to S213 are similar to the processing described with reference to the flow illustrated in FIG. 7 in the first embodiment described earlier. Hereinafter, the processing of steps S251 and S252 will be described.

The moving device 120 executes detection of occurrence of an abnormality in step S251.

This processing is executed by the flight control unit 122 of the moving device 120 illustrated in FIG. 8.

The flight control unit 122 of the moving device 120 constantly monitors whether or not an abnormality has occurred in the flight of the moving device 120. If an abnormality has occurred, this detection information is output to the moving device operation mode notification unit 221.

If occurrence of an abnormality has been detected in step S251, the processing proceeds to step S252.

If occurrence of an abnormality has not been detected, the abnormality detection processing in step S251 is continuously executed.

(Step S252)

If an abnormality has been detected in the flight of the moving device 120 in step S251, the processing proceeds to step S252.

In step S252, the moving device 120 notifies the remote control device 110 of occurrence of the abnormality.

This processing is executed by the moving device operation mode notification unit 221 of the moving device 120 illustrated in FIG. 8.

The moving device operation mode notification unit 221 executes processing of notifying the remote control device 110 of the operation mode of the moving device 120, such as a notification of an abnormality in the moving device 120.

The moving device operation mode notification unit 221 transmits, for example, operation mode information such as an abnormal state of the moving device 120 to the remote control device 110 via the wireless communication unit 126. Alternatively, a color or light emission pattern of an LED or the like may be output so that the remote control device 110 is notified of operation mode information such as an abnormal state of the moving device 120.

By this notification processing, the remote control device 110 detects an abnormality in the moving device 120, and executes the processing of steps S152 to S154 described earlier with reference to the flow illustrated in FIG. 10.

That is, the remote control device 110 limits the payload data in a packet to flight control information to reduce the packet size, and executes high-frequency packet transmission via the long-distance communication wireless link unit 117. This enables fine control of the moving device 120.

4. Configuration and Processing of Third Embodiment of Present Disclosure

Next, a configuration and processing of a third embodiment of the present disclosure will be described with reference to FIG. 12 and the following figures.

In the second embodiment described earlier, payload data is reduced mainly due to circumstances of the moving device 120, such as a case where an abnormality has occurred in the moving device 120. That is, in the embodiment, only flight control information is contained as payload data in a case where an abnormality has occurred in the moving device 120, so that the packet size is reduced and the frequency of transmitting packets via a long-distance link is improved.

A case where it is desired to reduce the payload data to reduce the packet size and improve the frequency of transmitting packets via a long-distance link is not limited to a case where an abnormality has occurred in the moving device 120.

In a case where, for example, it is required to immediately change a flight mode of the moving device 120 due to circumstances of the remote control device 110, it is effective to increase the packet transmission frequency.

In the third embodiment described below, in such a case, that is, due to circumstances of the remote control device 110, the packet transmission frequency is increased so that emergency control and robust control can be performed.

[4-1. Configuration Example of Remote Control Device and Moving Device]

First, a configuration example of a remote control device 110 and a moving device 120 of the third embodiment will be described with reference to FIG. 12.

Figure 12:
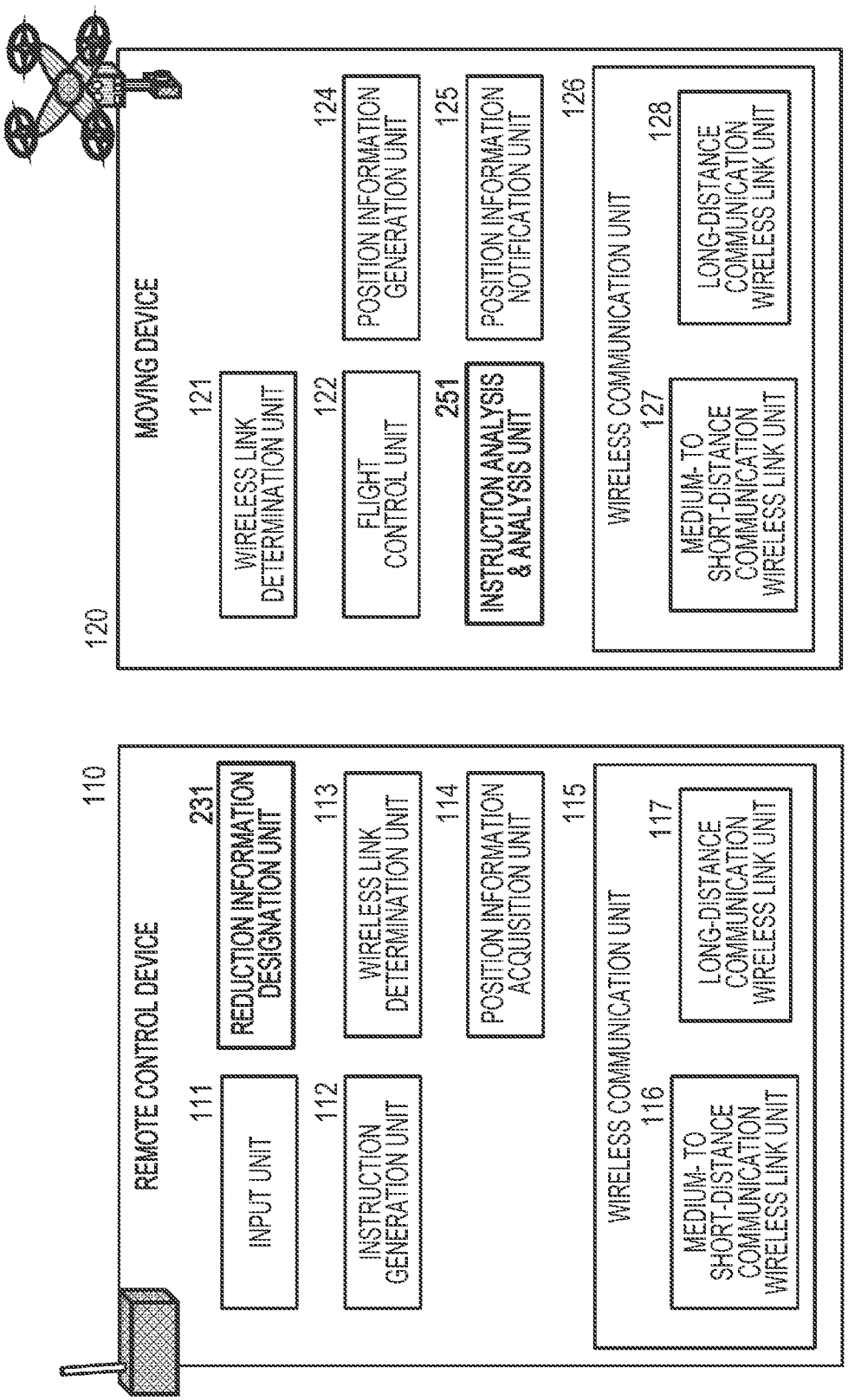
FIG. 12 is a block diagram illustrating configurations of a remote control device and a moving device of a third embodiment.

FIG. 12 is a block diagram illustrating configurations of the remote control device 110 and the moving device 120 of the third embodiment.

The remote control device 110 includes an input unit 111, an instruction generation unit 112, a wireless link determination unit 113, a position information acquisition unit 114, a wireless communication unit 115, and a reduction information designation unit 231.

The wireless communication unit 115 includes a medium-to short-distance communication wireless link unit 116 and a long-distance communication wireless link unit 117.

The remote control device 110 of the third embodiment has a configuration in which the reduction information designation unit 231 is added to the remote control device 110 of the first embodiment described earlier with reference to FIG. 3.

Furthermore, the instruction generation unit 112 executes processing different from that in the first embodiment.

The reduction information designation unit 231 generates information regarding designation of payload data to be contained in a packet or designation of payload data not to be contained in a packet in a case where it is desired to reduce the payload data to reduce the packet size and improve the transmission frequency of packets via a long-distance link. This designation information is input to the instruction generation unit 112.

The instruction generation unit 112 generates a small-sized packet with reduced payload data in accordance with the designation information from the reduction information designation unit 231.

The third embodiment is effective in a case where, for example, it is required to immediately change the flight mode of the moving device 120 due to circumstances of the remote control device 110, and the remote control device 110 proactively reduces the packet size. This processing makes it possible to transmit packets frequently while complying with the communication regulation (ARIB regulation) on the 920 MHz band of a long-distance link that the transmission time duty ratio should be 1/10 or less, thereby enabling fine control of the moving device 120.

The moving device 120 of the third embodiment illustrated in FIG. 12 includes a wireless link determination unit 121, a flight control unit 122, an instruction analysis & acquisition unit 251, a position information generation unit 124, a position information notification unit 125, and a wireless communication unit 126.

The wireless communication unit 126 includes a medium-to short-distance communication wireless link unit 127 and a long-distance communication wireless link unit 128.

The moving device 120 of the third embodiment illustrated in FIG. 12 has a configuration in which the instruction acquisition unit 123 in the moving device 120 of the first embodiment described earlier with reference to FIG. 3 is changed to the instruction analysis & acquisition unit 251.

The instruction analysis & acquisition unit 251 performs processing of identifying the content of control information (instruction information) contained as payload data in a packet received from the remote control device 110.

Moreover, the instruction analysis & acquisition unit 251 acquires the control information (instruction information) contained as payload data in the packet, and outputs the acquired control information (instruction information) to the flight control unit 122.

[4-2. Configuration Example of Packet Generated by Instruction Generation Unit]

Next, a configuration example of a packet generated by the instruction generation unit 112 of the remote control device 110 of the third embodiment will be described.

As described above, the instruction generation unit 112 generates a packet containing control information to be transmitted via the wireless communication unit 115. That is, a packet in which a control instruction in accordance with user operation information input via the input unit 111 is contained as payload data is generated.

ARIB STD-T108 specifies that the duty ratio of the transmission time should be 1/10 or less for communication in the 920 MHz band that is assumed to be used for long-distance links.

Thus, the instruction generation unit 112 of the remote control device 110 of the present disclosure makes a packet at the time of communication using the long-distance communication wireless link unit 117 to be smaller in data size than a packet at the time of communication using the medium- to short-distance communication wireless link unit 116. That is, the packet size is reduced to improve the frequency of transmitting packets via a long-distance link.

In the second embodiment described previously, in a case where, for example, an abnormality has occurred in the moving device 120, only flight control information is contained as payload data so that the packet size is reduced.

In the third embodiment, in a case where, for example, there is no abnormality in the moving device 120 but it is desired to perform emergency flight control, the payload data is limited due to circumstances of the remote control device 110, so that the packet size is reduced and the frequency of transmitting packets via a long-distance link is improved.

Figure 13:
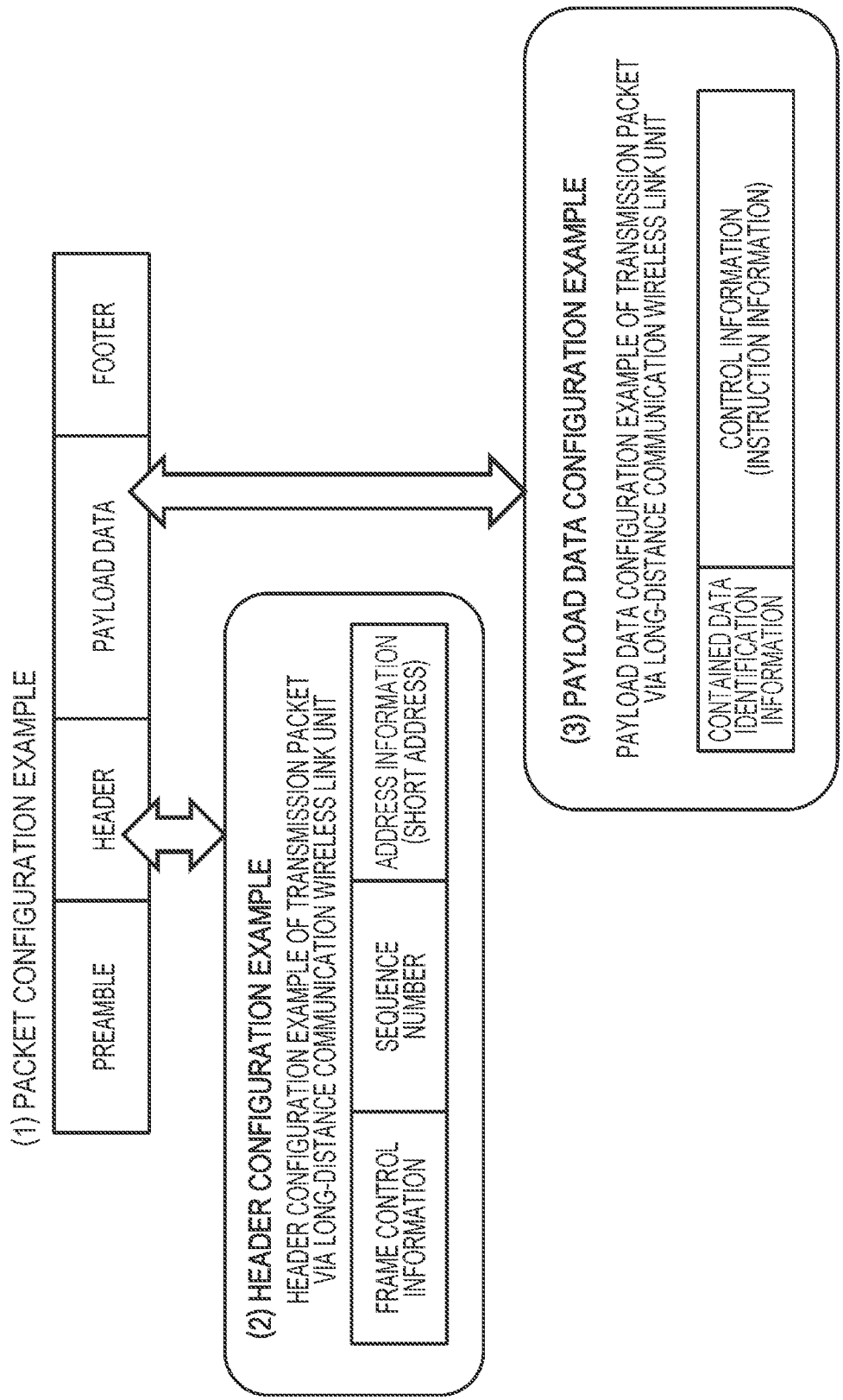
FIG. 13 is a diagram illustrating a specific example of a transmission packet generated by an instruction generation unit.

FIG. 13 illustrates a configuration example of a packet generated by the instruction generation unit 112 of the remote control device 110 in the third embodiment.

FIG. 13 illustrates each of the following figures.

(1) Packet configuration
(2) Header configuration example
(3) Payload data configuration example These are all packet configuration examples of transmission packets via long-distance links.

The (1) packet configuration and the (2) header configuration example have configurations similar to the configurations described earlier with reference to FIG. 5.

The (2) header configuration example has a configuration similar to that of the header of a transmission packet via the long-distance communication wireless link unit 117 illustrated in FIG. 5(2*b*), and has frame control information, a sequence number, and address information (short address).

As illustrated in the payload data configuration example in FIG. 13(3), in the third embodiment, payload data in a packet generated by the instruction generation unit 112 of the remote control device 110 is constituted by two types of data, contained data identification information and control information (instruction information).

The contained data identification information is information for identifying control information (instruction information).

The third embodiment allows only control information (instruction information) optionally selected by the remote control device 110 to be contained as payload. Therefore, the moving device 120 may not be able to perform normal control unless the content of the control information (instruction information) selected by the remote control device 110 is identified.

The contained data identification information is information for identifying the content of the control information (instruction information) contained as payload data in a packet. Note that position information indicating the position where each piece of control information is contained may be further included.

The moving device 120 analyzes the contained data identification information recorded at the beginning of payload data in a packet received from the remote control device 110, and this makes it possible to identify the content of the control information (instruction information) contained following the contained data identification information.

In the third embodiment, when a long-distance link in which the duty ratio of the transmission time is specified to be ⅒ or less is used, the reduction information designation unit 231 of the remote control device 110 generates information regarding designation of payload data to be contained in a packet or designation of payload not to be contained in a packet.

This designation information is input to the instruction generation unit 112, and the instruction generation unit 112 generates a small-sized packet with reduced payload data in accordance with the designation information from the reduction information designation unit 231. At this time, as illustrated in FIG. 13, two types of data, contained data identification information and control information (instruction information), are contained as payload data in the packet.

In the third embodiment, the time T [seconds] required to transmit one packet (one frame) at the time of communication using the long-distance communication wireless link unit 117 is calculated by the following (Equation 6).

$$T=(P+H+D3+X)/B \qquad \text{(Equation 6)}$$

P, H, D3, and B are the bit depths of the components of a packet, where
preamble=P [bits],
header=H [bits],
payload data=D3 [bits] (=total data size of contained data identification information and control information (instruction information)), and
footer=X [bits].

Payload data=D3 is the total data bit depth of the contained data identification information and the control information (instruction information) described with reference to FIG. 13.

With the use of the time T [seconds] calculated in accordance with the above (Equation 6), that is, the time T [seconds] required to transmit one packet (one frame) at the time of communication using the long-distance communication wireless link unit 117, a transmission frequency F (L3) [Hz] at the time of communication using the long-distance communication wireless link unit 117 can be calculated by the following equation (Equation 7).

$$F(L3) = 1/(10 \times (P+H+D3+X)/B) \qquad \text{(Equation 7)}$$
$$= 1/(10 \times T)$$

As described above, communication using the long-distance communication wireless link unit 117 is executed as communication using the 920 MHz communication band. As a restrictive regulation related to transmission in this band, the ARIB regulation that the transmission time duty ratio should be ⅒ or less has been imposed, and packets need to be transmitted in accordance with this regulation.

The above (Equation 7) represents the packet transmission frequency F (L3) [Hz] calculated in consideration of this duty ratio regulation.

In the present embodiment, the remote control device 110 proactively limits the data contained as payload data in the packet to reduce the packet size in this way, and this makes it possible to increase the packet transmission frequency even in a case of communication via the long-distance communication wireless link unit 117, and this enables fine control of the moving device 120.

Note that, also in the second embodiment described earlier, data to be contained in the payload is limited to flight control information, but in the case of the second embodiment, the data is limited to preset flight control information already acknowledged on the moving device 120 side, and the recording of the "contained data identification information" described previously is not essential.

However, also in the configuration of the second embodiment, "contained data identification information" similar to that in the third embodiment may be recorded.

[4-3. Processing Sequence Executed by Remote Control Device]

Next, a processing sequence executed by the remote control device 110 in the third embodiment will be described with reference to a flowchart illustrated in FIG. 14.

Note that, in the flow illustrated in FIG. 14, each piece of processing of steps S101 to S103, steps S111 to S113, and steps S121 to S123 is similar to the processing described with reference to the flow illustrated in FIG. 6 in the first embodiment described earlier, and the description thereof will be omitted.

Figure 14:
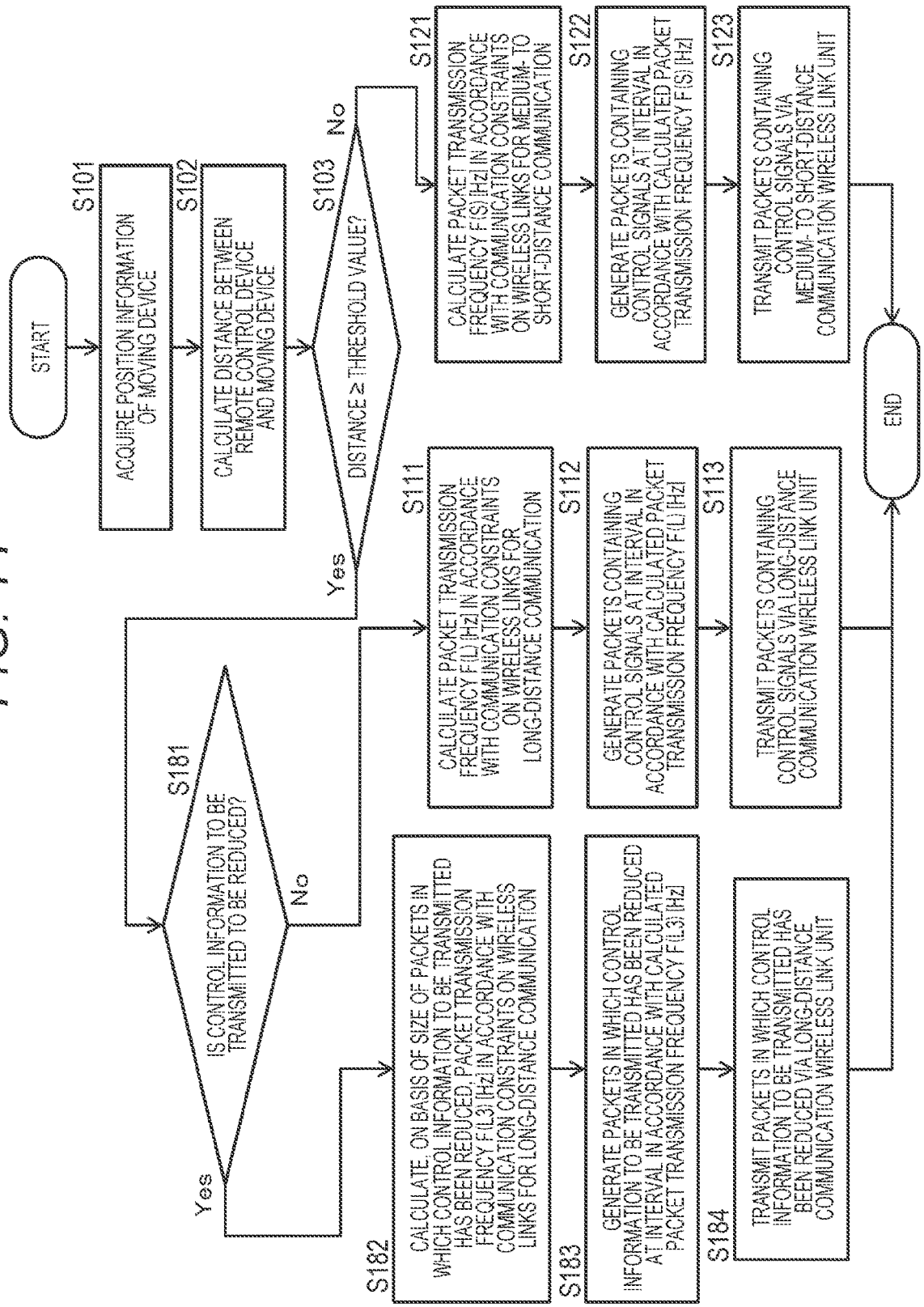
FIG. 14 is a flowchart illustrating a processing sequence executed by the remote control device.

In the flow illustrated in FIG. 14, processing of steps S181 to S184 is specific to the third embodiment. Details of these pieces of processing will be described below.

(Step S181)

Step S181 is processing to be executed in a case where it is determined in step S103 that the distance between the remote control device 110 and the moving device 120 is equal to or greater than the threshold value.

In this case, the remote control device 110 determines in step S181 whether or not to reduce the control information (instruction information) to be transmitted to the moving device 120.

As described above, there are some cases where the remote control device 110 requires that the packet transmission frequency be increased for fine control, such as a case where it is required to immediately change the flight mode of the moving device 120. In such cases, it is possible to reduce the packet size and increase the packet transmission frequency, and the remote control device 110 reduces the control information (instruction information) to be transmitted to the moving device 120 in order to reduce the packet size.

This reduction in packet size allows for an increase in packet transmission frequency.

If it is determined in step S181 that the control information (instruction information) to be transmitted to the moving device 120 is to be reduced, the determination in step S181 is Yes, and the processing proceeds to step S182.

On the other hand, if the control information (instruction information) to be transmitted to the moving device 120 is not to be reduced, the determination in step S181 is No, and the processing proceeds to step S111. The processing of steps S111 to S113 is similar to the processing described with reference to the flow in FIG. 6 in the first embodiment described earlier.

(Step S182)

Processing of steps S182 to S184 is executed in a case where it is determined in step S103 that the distance between the remote control device 110 and the moving device 120 is equal to or greater than the threshold value, and then it is determined in step S181 that the control information (instruction information) to be transmitted to the moving device 120 is to be reduced.

In this case, the remote control device 110 first calculates, on the basis of the packet size of a packet in which the control information (instruction information) of the payload data to be contained in the packet has been reduced, the packet transmission frequency F (L3) [Hz] in accordance with the communication constraints on wireless links for long-distance communication in step S182.

This processing is executed by the instruction generation unit 112 of the remote control device 110 illustrated in FIG. 12.

Note that, as described above, first, the reduction information designation unit 231 of the remote control device 110 illustrated in FIG. 12 generates information regarding designation of payload data to be contained in a packet or designation of payload data not to be contained in a packet. This designation information is input to the instruction generation unit 112, and the instruction generation unit 112 generates a small-sized packet with reduced payload data in accordance with the designation information from the reduction information designation unit 231.

The instruction generation unit 112 calculates the packet transmission frequency F (L3) [Hz] in a case of communication using the long-distance communication wireless link unit 117 on the basis of the packet size of a packet containing only control information in accordance with the designation information from the reduction information designation unit 231.

In a packet containing reduced control information, the payload data size is reduced as described earlier with reference to FIG. 13.

The data size of the payload data is expressed as D3.

On the basis of the packet size of the packet with reduced payload data, the packet transmission frequency F (L3) [Hz] at the time of communication using the long-distance communication wireless link unit 117 is calculated. As described earlier, the following equation (Equation 7) can be used for the calculation.

$$F(L3) = 1/(10 \times (P + H + D3 + X)/B) \quad \text{(Equation 7)}$$
$$= 1/(10 \times T)$$

Note that T in the above (Equation 7) is the time T [seconds] required to transmit one packet (one frame) calculated by the (Equation 6) described earlier. That is, $$T=(P+H+D3+X)/B \quad \text{(Equation 6)}$$

It is a value calculated by the above (Equation 4).

P, H, D3, and B are the bit depths of the components of a packet, where preamble=P [bits], header=H [bits], payload data=D3 [bits] (=total data size of contained data identification information and control information (instruction information)), and footer=X [bits].

Payload data=D3 [bits] in the above (Equation 6) and (Equation 7) is the total data bit depth of the contained data identification information and the control information (instruction information).

Furthermore, in the above (Equation 7), 10 in (10×T) is a parameter in accordance with the ARIB regulation regarding communication using the 920 MHz communication band, that is, the regulation that the transmission time duty ratio should be 1/10 or less.

In step S182, the instruction generation unit 112 of the remote control device 110 illustrated in FIG. 12 calculates the packet transmission frequency F (L3) [Hz] at the time of communication using the long-distance communication wireless link unit 117 in accordance with the above (Equation 7).

(Step S183)

Next, in step S183, the remote control device 110 generates packets at an interval in accordance with the packet transmission frequency F (L3) [Hz] in accordance with the communication constraints on wireless links for long-distance communication calculated in step S182.

This processing is also executed by the instruction generation unit 112 of the remote control device 110 illustrated in FIG. 12.

The instruction generation unit 112 selectively acquires only the flight control information from the operation information input from the input unit 111 at an interval specified by the packet transmission frequency F (L3) [Hz] calculated in step S182, and generates packets containing only the selectively acquired flight control information as payload data.

Note that the generated packets have the header illustrated in FIG. 13(2), and have the payload data illustrated in FIG. 13(3), that is, payload data constituted by two types of data, contained data identification information and control information (instruction information).

The packet size is smaller than that of packets transmitted via the medium- to short-distance communication wireless link unit 116.

(Step S184)

Next, in step S184, the remote control device 110 transmits the packets generated in step S183 via the long-distance communication wireless link unit 117.

This processing is executed by the instruction generation unit 112 and the long-distance communication wireless link unit 117 of the remote control device 110 illustrated in FIG. 12.

The instruction generation unit 112 outputs the packets generated in step S183 to the long-distance communication wireless link unit 117. The long-distance communication wireless link unit 117 transmits the packets to the moving device 120 at the packet transmission frequency F (L) [Hz] calculated in step S111.

In this way, payload data in the packets is limited to limited information, and then packets in which identification information indicating what kind of information has been contained is contained are generated and transmitted. By this processing, it is possible to increase the packet transmission frequency even in a case of communication via the long-distance communication wireless link unit 117, and this enables fine control of the moving device 120.

[4-4. Processing Sequence Executed by Moving Device]

Next, a processing sequence executed by the moving device 120 in the third embodiment will be described with reference to a flowchart illustrated in FIG. 15.

Note that, in the flow illustrated in FIG. 15, each piece of processing of step S201, step S202, and steps S211 to S213 is similar to the processing described with reference to the flow illustrated in FIG. 7 in the first embodiment described earlier, and the description thereof will be omitted.

Figure 15:
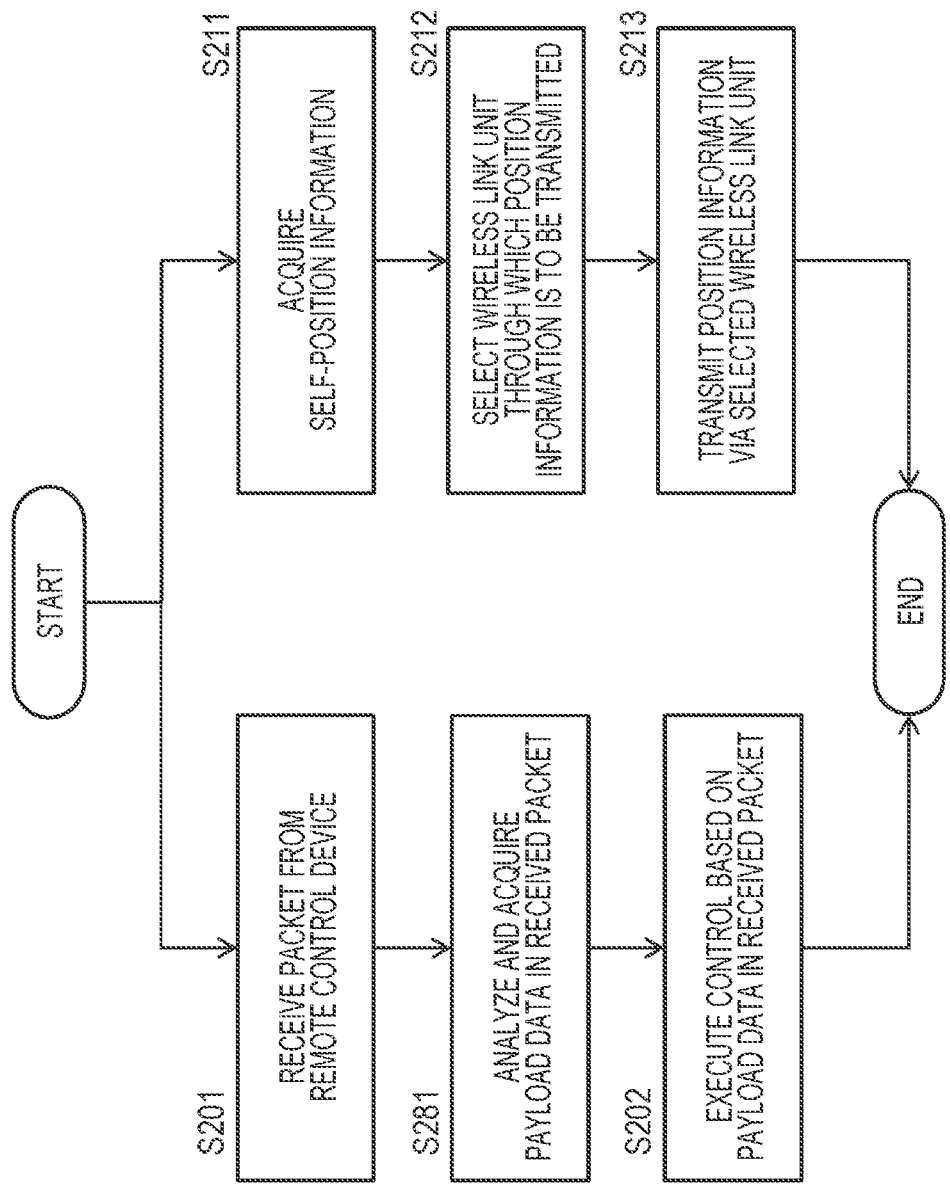
FIG. 15 is a flowchart illustrating a processing sequence executed by the moving device.

In the flow illustrated in FIG. 15, processing of step S281 is specific to the second embodiment. Details of this processing will be described below.

(Step S281)

Processing of steps S201, S281, and S202 described below and the processing of steps S211 to S213 are executed in parallel by the moving device 120.

The moving device 120, upon receiving a packet from the remote control device in step S201, executes the processing of step S251.

In step S251, the moving device 120 executes processing of analyzing the payload data in the received packet and acquiring the control information (instruction information).

This processing is executed by the instruction analysis & acquisition unit 251 of the moving device 120 illustrated in FIG. 12.

The instruction analysis & acquisition unit 251 performs processing of identifying the content of control information (instruction information) contained as payload data in a packet received from the remote control device 110.

Payload data in a packet received from the remote control device 110 has the configuration described earlier with reference to FIG. 13(3). That is, in the third embodiment, payload data in a packet generated by the instruction generation unit 112 of the remote control device 110 is constituted by two types of data, contained data identification information and control information (instruction information).

The contained data identification information is information for identifying control information (instruction information).

The instruction analysis & acquisition unit 251 of the moving device 120 refers to the contained data identification information contained at the beginning of the payload data in a packet received from the remote control device 110, and identifies the content of the control information (instruction information) contained in the latter half of the payload data. Note that, in a case where information regarding the position where each piece of control information is contained is recorded in the contained data identification information, that information is also acquired, and the position where each piece of control information is contained is identified.

Moreover, the instruction analysis & acquisition unit 251 acquires the control information (instruction information) contained as payload data in the packet, and outputs the acquired control information (instruction information) to the flight control unit 122.

After these pieces of processing, the processing proceeds to step S202.

In step S202, the moving device 120 executes control based on the control information (instruction information) contained as payload data in the received packet.

As described previously, in the third embodiment, the remote control device 110 limits the control information to be contained in the payload data in the packet on the basis of its own determination, and also generates and transmits a packet containing "contained data identification information" that indicates what kind of information is contained.

The moving device 120 can determine what kind of control information is contained in the packet by referring to the "contained data identification information" in the packet.

By these pieces of processing, it is possible to increase the packet transmission frequency even in a case of communication via the long-distance communication wireless link unit 117, and this enables fine control of the moving device 120.

Note that, although the first to third embodiments described previously can be executed as individual configurations, a plurality of embodiments may be combined.

5. Summary of Configuration of Present Disclosure

The embodiments of the present disclosure have been described above in detail with reference to the specific embodiments. However, it is obvious that those skilled in the art may make modifications and substitutions to the embodiments without departing from the gist of the present disclosure. That is, the present invention has been disclosed in the form of exemplification and should not be interpreted restrictively. In order to determine the gist of the present disclosure, the claims should be taken into consideration.

Note that the technology disclosed in the present specification may have the following configurations.

(1) A remote control device including:
an instruction generation unit that generates a packet containing control information for a moving device; and
a wireless communication unit that transmits the packet generated by the instruction generation unit,
in which the wireless communication unit includes a plurality of wireless link units that executes wireless communication in different frequency bands, and the instruction generation unit executes, in a case where a distance to the moving device is equal to or greater than a threshold value, packet generation processing that makes the packet smaller in size than in a case where the distance is less than the threshold value.

(2) The remote control device according to (1), in which the wireless communication unit includes:
a long-distance communication wireless link unit that is used in a case where the distance is equal to or greater than the threshold value; and
a medium- to short-distance communication wireless link unit that is used in a case where the distance is less than the threshold value, and
the long-distance communication wireless link unit executes communication in a lower frequency band than the medium- to short-distance communication wireless link unit.

(3) The remote control device according to (1) or (2), in which
the instruction generation unit increases, in a case where the distance is equal to or greater than the threshold value, a frequency of packet transmission from the wireless communication unit by reducing the packet size and increasing a packet generation frequency.

(4) The remote control device according to (3), in which
the instruction generation unit calculates an allowable packet transmission frequency on the basis of the packet size, and generates packets in accordance with the calculated packet transmission frequency.

(5) The remote control device according to (4), in which
the allowable packet transmission frequency is a packet transmission frequency in accordance with a regulation corresponding to a communication frequency band.

(6) The remote control device according to any one of (1) to (5), in which
the instruction generation unit executes processing of reducing a size of a header of the packet in a case where the distance to the moving device is equal to or greater than the threshold value.

(7) The remote control device according to (6), in which
the instruction generation unit executes, in a case where the distance to the moving device is equal to or greater than the threshold value, at least one of processing of reducing additional information of the header of the packet or processing of reducing contained address data.

(8) The remote control device according to (7), in which
the additional information is encrypted information.

(9) The remote control device according to any one of (1) to (8), in which
the instruction generation unit executes processing of reducing a size of payload data in the packet in a case where the distance to the moving device is equal to or greater than the threshold value.

(10) The remote control device according to (9), further including:
a mode acquisition unit that acquires mode information of the moving device,
in which in a case where the mode acquisition unit detects an abnormality in the moving device,
the instruction generation unit limits the control information to be contained in the payload of the packet to information regarding movement control of the moving device.

(11) The remote control device according to (9) or (10), in which
the instruction generation unit reduces the control information to be contained in the payload of the packet, and makes the payload contain identification information for identifying the control information contained as the payload.

(12) The remote control device according to (9) to (11), further including:
a reduction information designation unit that determines the control information to be contained in the payload of the packet,
in which the instruction generation unit determines the control information to be contained in the packet on the basis of designation information generated by the reduction information designation unit.

(13) A moving device including:
a wireless communication unit that includes a plurality of wireless link units capable of executing communication in different frequency bands;
a position information generation unit that generates position information of the moving device;
a position information notification unit that transmits the position information generated by the position information generation unit to a remote control device via the wireless communication unit; and
a wireless link determination unit that determines which of the plurality of wireless link units of the wireless communication unit is to be used for transmission of the position information,
in which the wireless link determination unit determines a wireless link unit that has received a latest packet from the remote control device as a transmission unit for the position information.

(14) The moving device according to (13), further including:
an instruction acquisition unit that acquires control information from a packet received by the wireless communication unit; and
a control unit that executes movement control of the moving device on the basis of the control information acquired by the instruction acquisition unit.

(15) The moving device according to (13) or (14), further including:
an operation mode notification unit that notifies the remote control device of an operation mode of the moving device.

(16) The moving device according to any one of (13) to (15), further including:
an analysis unit that analyzes contained data identification information contained in payload data in a packet received from the remote control device, and identifies the control information contained in the payload data.

(17) A communication control method executed by a remote control device, the communication control method including:
an instruction generation step of generating, by an instruction generation unit, a packet containing control information for a moving device; and
a wireless communication step of transmitting, by a wireless communication unit, the packet generated in the instruction generation step,
in which the wireless communication unit includes a plurality of wireless link units that executes wireless communication in different frequency bands, and
in the instruction generation step, packet generation processing is executed in which, in a case where a distance to the moving device is equal to or greater than a threshold value, the generated packet is smaller in size than in a case where the distance to the moving device is less than the threshold value.

(18) A communication control method executed by a moving device,
in which the moving device includes:
a wireless communication unit that includes a plurality of wireless link units capable of executing communication in different frequency bands;
a position information generation unit that generates position information of the moving device;
a position information notification unit that transmits the position information generated by the position information generation unit to a remote control device via the wireless communication unit; and
a wireless link determination unit that determines which of the plurality of wireless link units of the wireless communication unit is to be used for transmission of the position information, and
the wireless link determination unit determines a wireless link unit that has received a latest packet from the remote control device as a transmission unit for the position information.

(19) A program that causes a remote control device to execute communication control processing, the program causing:
an instruction generation unit to execute an instruction generation step of generating a packet containing control information for a moving device; and
a wireless communication unit to execute a wireless communication step of transmitting the packet generated in the instruction generation step,
in which the wireless communication unit includes a plurality of wireless link units that executes wireless communication in different frequency bands, and
the program causes, in the instruction generation step, execution of packet generation processing in which, in a case where a distance to the moving device is equal to or greater than a threshold value, the generated packet is smaller in size than in a case where the distance to the moving device is less than the threshold value.

Furthermore, the series of processing described in the specification can be executed by hardware, software, or a combination of both. In a case where the processing is executed by software, it is possible to install a program in which a processing sequence has been recorded on a memory in a computer built in dedicated hardware and execute the program, or it is possible to install a program on a general-purpose computer capable of executing various types of processing and execute the program. For example, the program can be recorded in a recording medium in advance. Besides being installed on a computer from a recording medium, the program can be received via a network such as a local area network (LAN) or the Internet and then installed on a recording medium such as a built-in hard disk.

Note that the various types of processing described in the specification may be executed not only in time series in accordance with the description but also in parallel or individually as necessary or in accordance with a processing capability of the device that executes the processing. Furthermore, in the present specification, a system is a logical set configuration of a plurality of devices, and is not limited to one in which each configuration device is in the same housing.

INDUSTRIAL APPLICABILITY

As described above, according to the configuration of one embodiment of the present disclosure, even in communication via the long-distance wireless link unit, the packet size is reduced and the packet transmission frequency is increased so that a moving device can be finely controlled.

Specifically, for example, an instruction generation unit that generates a packet containing control information for a moving device, and a wireless communication unit that transmits the packet are included. The wireless communication unit includes a plurality of wireless link units that executes wireless communication in different frequency bands. In a case where the distance to the moving device is equal to or greater than a threshold value, the instruction generation unit generates a packet of a size smaller than that in a case where the distance is less than the threshold value, and calculates an allowable packet transmission frequency on the basis of the packet size, thereby executing high-frequency packet generation and transmission processing.

With this configuration, even in communication via the long-distance wireless link unit, the packet size is reduced and the packet transmission frequency is increased so that a moving device can be finely controlled.

REFERENCE SIGNS LIST

10 Remote control device (remote controller)
20 Moving device (drone)
25 Camera
110 Remote control device
111 Input unit
112 Instruction generation unit
113 Wireless link determination unit
114 Position information acquisition unit
115 Wireless communication unit
116 Medium- to short-distance communication wireless link unit
117 Long-distance communication wireless link unit
120 Moving device
121 Wireless link determination unit
122 Flight control unit
123 Instruction acquisition unit
124 Position information generation unit
125 Position information notification unit
126 Wireless communication unit
127 Medium- to short-distance communication wireless link unit
128 Long-distance communication wireless link unit
211 Moving device operation mode acquisition unit
221 Moving device operation mode notification unit
231 Reduction information designation unit
251 Instruction analysis & acquisition unit

The invention claimed is:
1. A remote control device, comprising:
an instruction generation unit that generates a packet containing control information for a moving device; and
a wireless communication unit that transmits the packet generated by the instruction generation unit, wherein
the wireless communication unit includes a plurality of wireless link units that executes wireless communication in different frequency bands, and
the instruction generation unit executes, in a case where a distance to the moving device is equal to or greater than a threshold value, packet generation processing that makes the packet smaller in size than in a case where the distance is less than the threshold value.

2. The remote control device according to claim 1, wherein
the wireless communication unit includes:
a long-distance communication wireless link unit that is used in a case where the distance is equal to or greater than the threshold value; and
a medium- to short-distance communication wireless link unit that is used in a case where the distance is less than the threshold value, and
the long-distance communication wireless link unit executes communication in a lower frequency band than the medium- to short-distance communication wireless link unit.

3. The remote control device according to claim 1, wherein
the instruction generation unit increases, in a case where the distance is equal to or greater than the threshold value, a frequency of packet transmission from the wireless communication unit by reducing a packet size and increasing a packet generation frequency.

4. The remote control device according to claim 3, wherein
the instruction generation unit calculates an allowable packet transmission frequency on a basis of the packet size, and generates packets in accordance with the calculated allowable packet transmission frequency.

5. The remote control device according to claim 4, wherein the allowable packet transmission frequency is a packet transmission frequency in accordance with a regulation corresponding to a communication frequency band.

6. The remote control device according to claim 1, wherein
the instruction generation unit executes processing of reducing a size of a header of the packet in a case where the distance to the moving device is equal to or greater than the threshold value.

7. The remote control device according to claim 6, wherein
the instruction generation unit executes, in a case where the distance to the moving device is equal to or greater than the threshold value, at least one of processing of reducing additional information of the header of the packet or processing of reducing contained address data.

8. The remote control device according to claim 7, wherein the additional information is encrypted information.

9. The remote control device according to claim 1, wherein
the instruction generation unit executes processing of reducing a size of payload data in the packet in a case where the distance to the moving device is equal to or greater than the threshold value.

10. The remote control device according to claim 9, further comprising:
a mode acquisition unit that acquires mode information of the moving device,
wherein in a case where the mode acquisition unit detects an abnormality in the moving device,
the instruction generation unit limits the control information to be contained in the payload data of the packet to information regarding movement control of the moving device.

11. The remote control device according to claim 9, wherein
the instruction generation unit reduces the control information to be contained in the payload data of the packet, and makes the payload data contain identification information for identifying the control information contained as the payload data.

12. The remote control device according to claim 9, further comprising:
a reduction information designation unit that determines the control information to be contained in the payload data of the packet,
wherein the instruction generation unit determines the control information to be contained in the packet on a basis of designation information generated by the reduction information designation unit.

13. A communication control method, comprising:
in a remote control device:
an instruction generation step of generating, by an instruction generation unit, a packet containing control information for a moving device; and
a wireless communication step of transmitting, by a wireless communication unit, the packet generated in the instruction generation step, wherein
the wireless communication unit includes a plurality of wireless link units that executes wireless communication in different frequency bands, and
in the instruction generation step, packet generation processing is executed in which, in a case where a distance to the moving device is equal to or greater than a threshold value, the generated packet is smaller in size than in a case where the distance to the moving device is less than the threshold value.

14. A non-transitory computer-readable medium storing instructions that causes a remote control device to execute communication control processing, the instructions causing:
an instruction generation unit to execute an instruction generation step of generating a packet containing control information for a moving device; and
a wireless communication unit to execute a wireless communication step of transmitting the packet generated in the instruction generation step, wherein
the wireless communication unit includes a plurality of wireless link units that executes wireless communication in different frequency bands, and
in the instruction generation step, execution of packet generation processing in which, in a case where a distance to the moving device is equal to or greater than a threshold value, the generated packet is smaller in size than in a case where the distance to the moving device is less than the threshold value.

* * * * *